United States Patent
Paniagua et al.

(10) Patent No.: US 10,739,954 B2
(45) Date of Patent: Aug. 11, 2020

(54) ENHANCED MULTI-TAB CO-BROWSING BETWEEN ONE OR MORE OPERATORS AND ONE OR MORE VISITORS

(71) Applicant: Glia Technologies, Inc., Wilmington, DE (US)

(72) Inventors: Carlos Paniagua, New York, NY (US); Madis Nomme, Tartu (EE); David Rodas, New York, NY (US); Mehrbod Sharifi, Pittsburgh, PA (US); Justin DiPietro, New York, NY (US); Daniel Michaeli, New York, NY (US)

(73) Assignee: GLIA TECHNOLOGIES, INC., Wilmington, DE (US)

( * ) Notice: Subject to any disclaimer, the term of this patent is extended or adjusted under 35 U.S.C. 154(b) by 18 days.

(21) Appl. No.: 15/624,859

(22) Filed: Jun. 16, 2017

(65) Prior Publication Data
US 2017/0285898 A1    Oct. 5, 2017

Related U.S. Application Data

(63) Continuation of application No. 13/940,890, filed on Jul. 12, 2013, now abandoned.
(Continued)

(51) Int. Cl.
*G06F 3/0484* (2013.01)
*G06F 16/957* (2019.01)
(Continued)

(52) U.S. Cl.
CPC .......... *G06F 3/0484* (2013.01); *G06F 3/0483* (2013.01); *G06F 16/957* (2019.01); *H04L 67/02* (2013.01); *H04L 67/22* (2013.01)

(58) Field of Classification Search
CPC . G06Q 30/02; G06F 3/1454; G06F 17/30861; G06F 17/30873; G06F 9/542;
(Continued)

(56) References Cited

U.S. PATENT DOCUMENTS 6,912,563 B1    6/2005  Parker et al.
7,523,409 B2    4/2009  Yolleck et al.
(Continued)

OTHER PUBLICATIONS

Dietwig Lowet, et al.; "Co-Browsing Dynamic Web Pages"; Track: Web Engineering/Session: Client Side Web Engineering; WWW 2009 Madrid, pp. 941-950; World Wide Web Conference, Apr. 20-24, 2009, Madrid, Spain.

*Primary Examiner* — Andrew L Tank
(74) *Attorney, Agent, or Firm* — Volpe and Koenig, P.C.

(57) ABSTRACT

Apparatuses, computer readable mediums, and methods of co-browsing between a visitor and an operator are disclosed. The method may include on a condition that an event associated with a tab is received, handling the event. The method may include on a condition of receiving a user interface event or a webpage data update from the visitor, handling the user interface event or received webpage data update. Another method may include on a condition of an operator becoming active, sending webpage data regarding an active tab for visitors. The method may include receiving a webpage data update associated with the active tab from a first visitor. The method may include storing the webpage data update based on the first visitor and the active tab. The method may include sending an indication of the webpage data update to the operator with an indication of the active tab and of the first visitor.

16 Claims, 18 Drawing Sheets

Related U.S. Application Data

(60) Provisional application No. 61/671,593, filed on Jul. 13, 2012, provisional application No. 61/810,367, filed on Apr. 10, 2013.

(51) Int. Cl.
*G06F 3/0483* (2013.01)
*H04L 29/08* (2006.01)

(58) Field of Classification Search
CPC .. G06F 2216/15; G06F 3/0484; G06F 3/0483; G06F 16/957; H04L 67/22; H04L 67/02
See application file for complete search history.

(56) References Cited

U.S. PATENT DOCUMENTS

| | | |
|---|---|---|
| 7,533,146 B1 | 5/2009 | Kumar |
| 7,660,899 B2 | 2/2010 | Gavrilescu et al. |
| 8,239,773 B1 | 8/2012 | Billman |
| 8,225,191 B1 | 10/2012 | Stull et al. |
| 8,504,615 B2 | 8/2013 | Vignisson et al. |
| 8,527,591 B2 | 9/2013 | Pirnazar |
| 8,713,444 B2 | 4/2014 | Sauve |
| 8,819,560 B2 | 8/2014 | Ortwein et al. |
| 2002/0032731 A1 | 3/2002 | Qian et al. |
| 2004/0041841 A1 | 3/2004 | Lemogne et al. |
| 2004/0225716 A1 | 11/2004 | Shamir et al. |
| 2005/0246422 A1 | 11/2005 | Laning |
| 2007/0116238 A1* | 5/2007 | Jacobi ................ H04M 3/5191 379/265.01 |
| 2007/0245249 A1* | 10/2007 | Weisberg ................ G06F 9/451 715/758 |
| 2007/0300291 A1 | 12/2007 | Bomgaars et al. |
| 2008/0276183 A1 | 11/2008 | Siegrist et al. |
| 2009/0037517 A1 | 2/2009 | Frei |
| 2009/0164581 A1 | 6/2009 | Bove et al. |
| 2009/0271713 A1 | 10/2009 | Stull et al. |
| 2010/0017412 A1 | 2/2010 | Sundaresan et al. |
| 2010/0082747 A1 | 4/2010 | Yue et al. |
| 2010/0083135 A1 | 4/2010 | Zawacki et al. |
| 2010/0161540 A1* | 6/2010 | Anisimov ............. G06Q 30/02 706/47 |
| 2010/0257451 A1 | 10/2010 | Halevi et al. |
| 2010/0306642 A1 | 12/2010 | Lowet et al. |
| 2011/0154219 A1 | 6/2011 | Khalatian |
| 2011/0191698 A1 | 8/2011 | Jain et al. |
| 2011/0289156 A1 | 11/2011 | Pirnazar |
| 2012/0005598 A1 | 1/2012 | Burckart et al. |
| 2012/0047449 A1 | 2/2012 | Burckart et al. |
| 2012/0089659 A1 | 4/2012 | Halevi et al. |
| 2012/0131485 A1 | 5/2012 | Svendsen et al. |
| 2012/0209954 A1 | 8/2012 | Wright |
| 2012/0210242 A1 | 8/2012 | Burckart et al. |
| 2013/0215116 A1 | 8/2013 | Siddique et al. |
| 2014/0019534 A1* | 1/2014 | Handrigan ........ G06F 17/30873 709/204 |

* cited by examiner

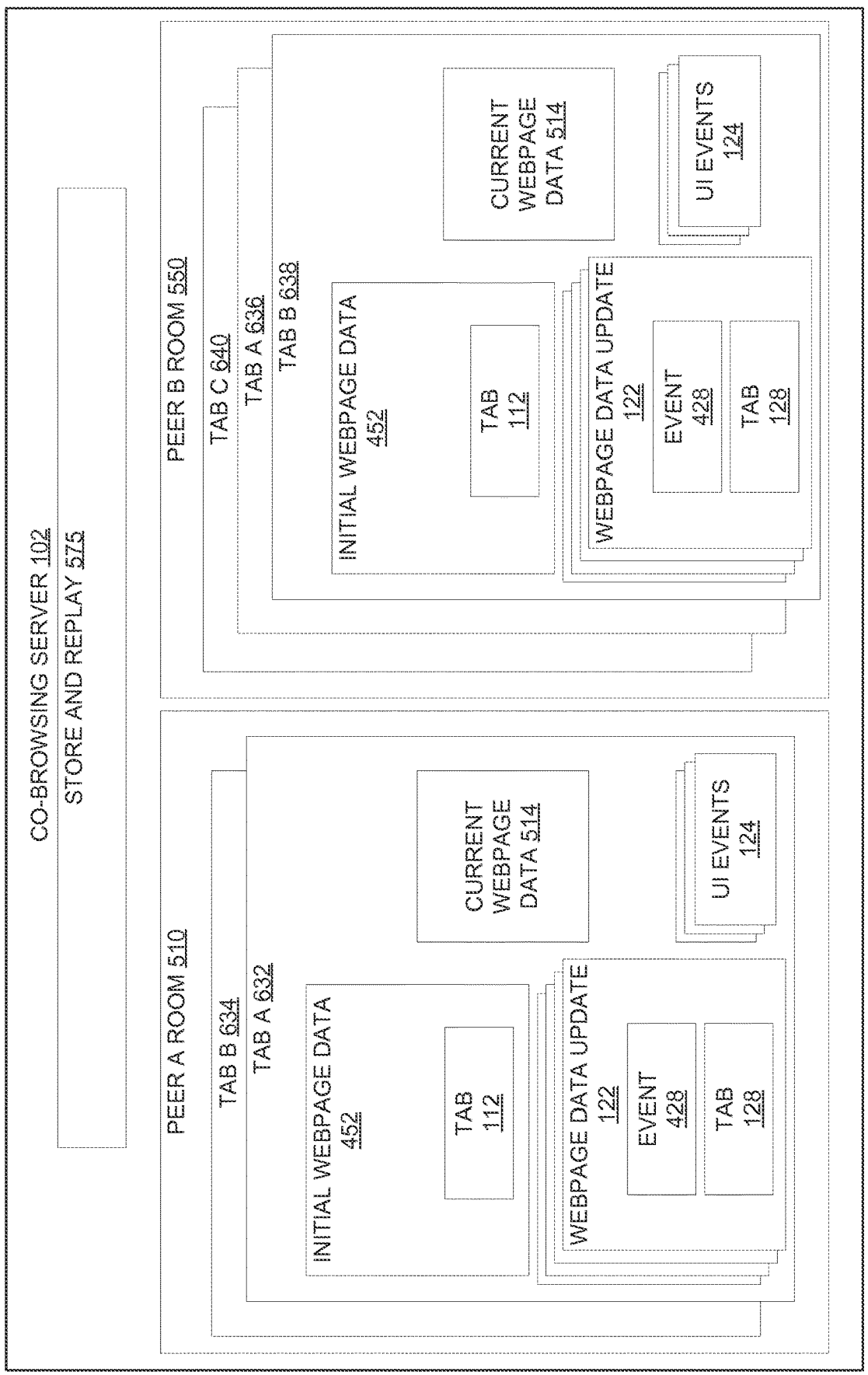

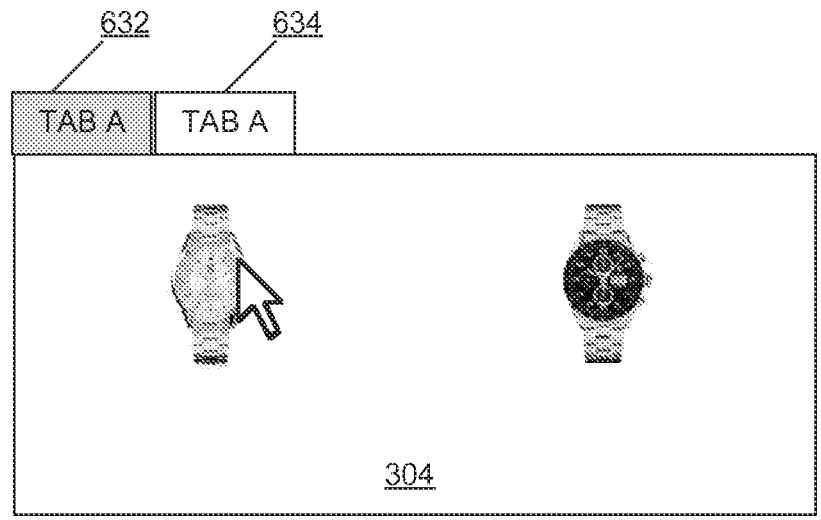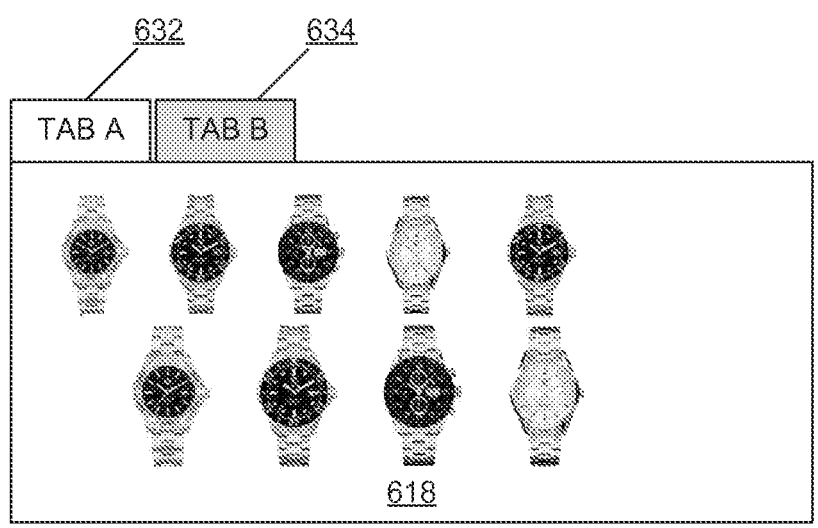
FIGURE 6A

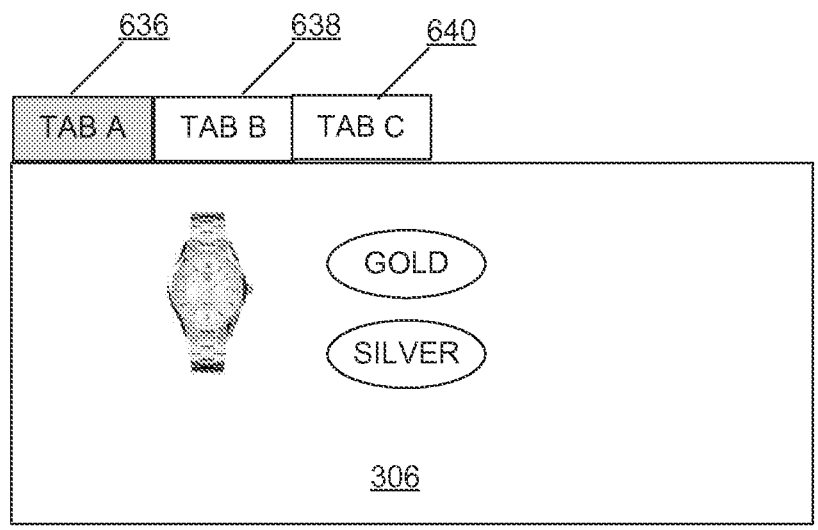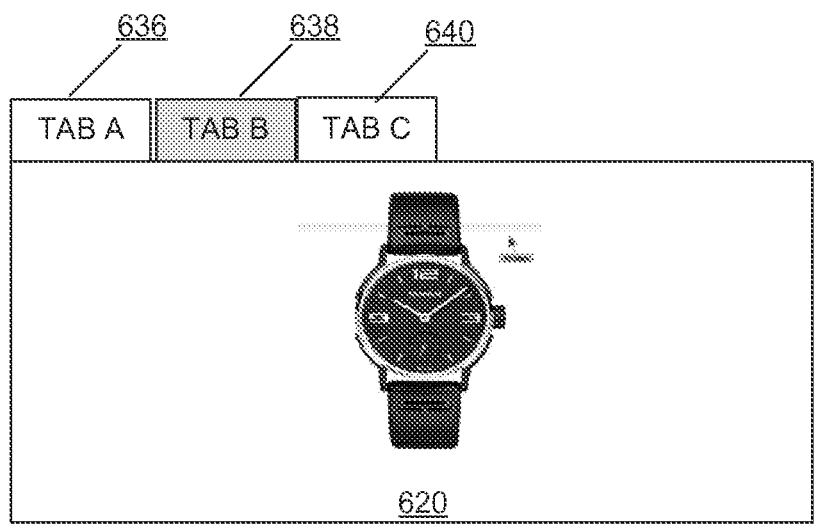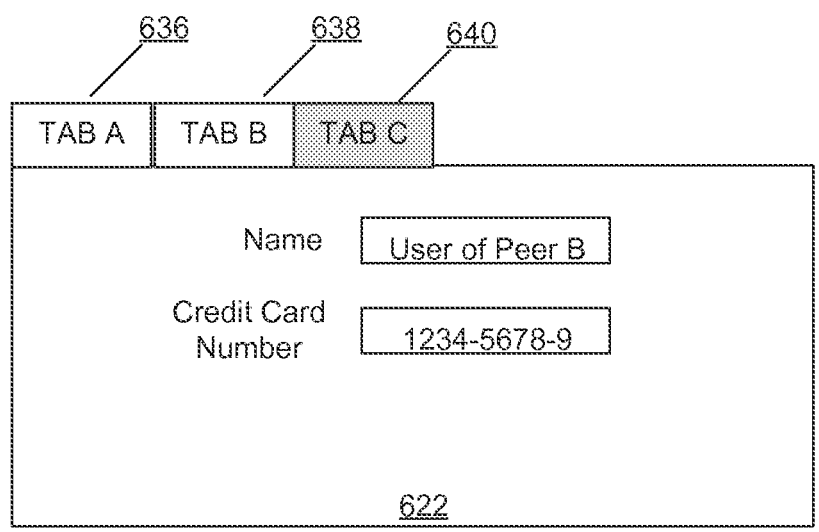
FIGURE 6B

ENHANCED MULTI-TAB CO-BROWSING BETWEEN ONE OR MORE OPERATORS AND ONE OR MORE VISITORS

CROSS REFERENCE TO RELATED APPLICATIONS

This application is a continuation of U.S. patent application Ser. No. 13/940,890, filed on Jul. 12, 2013, which claims the benefit of U.S. Patent Application No. 61/671,593, filed on Jul. 13, 2012, and U.S. Patent Application No. 61/810,367 filed on Apr. 10, 2013, the entire contents of which are herein incorporated by reference.

TECHNICAL FIELD

The disclosed embodiments are generally directed to co-browsing, and in particular, to co-browsing between one or more operators and one or more visitors.

BACKGROUND

Often, a visitor to a custom website needs assistance. For example, often a visitor to a custom website that offers products for sale needs help in a similar way as a visitor to a bricks and mortar store needs assistance. One way to assist the visitor is to permit an operator of the website to co-browse the website with the visitor. However, many co-browsing solutions do not provide a pleasant visitor experience. For example, often, co-browsing is achieved by sending back and forth the images of the screens of the visitor and operator, but this method often results in delays in the response time of the user interface and a degradation in the quality of the displayed screen. Additionally, often the co-browsing system will not accurately track where the visitor is in the custom website.

Therefore, there is a need in the art for an apparatus, computer readable medium, and method of multi-tab co-browsing.

SUMMARY OF EMBODIMENTS

Some disclosed embodiments provide a method of co-browsing between a visitor and an operator. The method may include on a condition of the operator becoming active with a first web application, sending webpage data regarding an active tab for each of the one or more visitors to the operator, wherein the active tab is for a second web application. The method may include receiving a webpage data update associated with the active tab from a first visitor of the one or more visitors. The method may include storing the webpage data update based on the first visitor and the active tab. The method may include sending an indication of the webpage data update to the operator with an indication of the active tab and an indication of the first visitor.

In some embodiments, the method may include synchronizing the webpage data update into a current webpage data of the tab for the first visitor. Sending may include sending the synchronized current webpage data of the tab for the first visitor.

The method may include adapting the webpage data update from a first web application interface of the first visitor to a second web application interface of the operator. Sending may include sending the adapted webpage data update to the operator with the indication of the tab and the indication of the first visitor.

The method may include on a condition of receiving an indication from the operator to co-browse with the first visitor, sending an indication of an active tab of the first visitor to the operator.

The method may include on a condition of receiving an indication that the operator is monitoring the first visitor, sending a current webpage data for an active tab of the first visitor to the operator.

Sending may include for each tab of the first visitor, sending the current webpage data and sending an indication of an active tab The method may include sending instructions to the first visitor to display a visitor communications area. The visitor communication area may include an area for the visitor and an area for the operator. The method may include sending instructions to the operator to display an operator communication area. The operator communication area may include an area for the visitor and an area for the operator.

A method of co-browsing between a visitor and an operator is disclosed. The method may include on a condition of an event associated with a tab, updating the tab based on the event to generate an updated tab, generating a first webpage data update indicating the difference between the tab and the updated tab, and sending the first webpage data update to the operator.

The method may include on a condition of receiving a user interface event or a second webpage data update from the operator, updating the tab based on the user interface event or the second webpage data update from the operator.

The method may include on a condition of receiving the user interface event or the second webpage data update from the operator when the first webpage data update is not implemented by the operator, determining based on a precedence between the operator and the visitor whether to restore the updated tab to the tab, and update the tab based on the user interface event or the second webpage data update, or to discard the user interface event or the second webpage data update.

Updating the tab may include sending a request to a custom website based on the event. The request may be sent directly to the custom website.

The method may include adapting the first webpage data update for the operator, wherein adapting comprises adapting the first webpage data update according to a first web browsing application of the visitor to a second web browsing application of the operator.

Updating may include generating a second webpage data update indicating the difference between the tab and the updated tab, and sending the second webpage data update to the operator.

A method of co-browsing between a visitor and an operator is disclosed. The method may include on a condition of an event associated with a tab being generated, handling the event.

The method may include on a condition of receiving a user interface event or a webpage data update from the visitor, handling the user interface event or received webpage data update.

Handling the event may include sending a user interface (UI) events with an indication of the event associated with the tab to a visitor, receiving from the visitor a second webpage data update indicating a second update to the active tab based on the event, and updating the active tab based on the second webpage data update.

The method may include adapting the second webpage data update for the operator. Adapting may include adapting the second webpage data update according to a first web browsing application of the operator to a second web browsing application of the visitor.

Handling the event may include updating the tab based on the event to generate an updated tab, generating a first webpage data update indicating the difference between the tab and the updated tab, and sending the first webpage data update to the operator.

Updating the tab may include sending a request to a custom website based on the event. The request may be sent directly to the custom website.

Handling the user interface event or the received webpage data update may include updating the tab based on the user interface event to generate an updated tab, generating a second webpage data update indicating the difference between the tab and the updated tab, and sending the second webpage data update to the visitor.

Handling the user interface event or the received webpage data update may include updating the tab based on the received webpage data update.

The method may include on a condition of receiving the user interface event or the received webpage data update from the visitor when the event associated with the tab has not yet been handled, determining based on a precedence between the operator and the visitor whether to handle the event, or to handle the received user interface event or the received webpage data update.

The method may include on a condition of receiving a second webpage data update from the visitor indicating a second update to a new tab, updating the new tab based on the second webpage data update and switching a web interface application to the new tab.

Some embodiments provide a computer readable non-transitory medium including instructions which when executed in a processing system cause the processing system to execute a method for multiple-tab co-browsing.

BRIEF DESCRIPTION OF THE DRAWINGS

A more detailed understanding may be had from the following description, given by way of example in conjunction with the accompanying drawings wherein:

FIG. 5 schematically illustrates the co-browsing server 102 according to some disclosed embodiments;

FIG. 6A schematically illustrates the tabs that peer A has opened in one or more web application interfaces;

FIG. 6B schematically illustrates the tabs that peer B has opened in one or more web application interfaces;

DETAILED DESCRIPTION OF EMBODIMENT(S)

Figure 1:
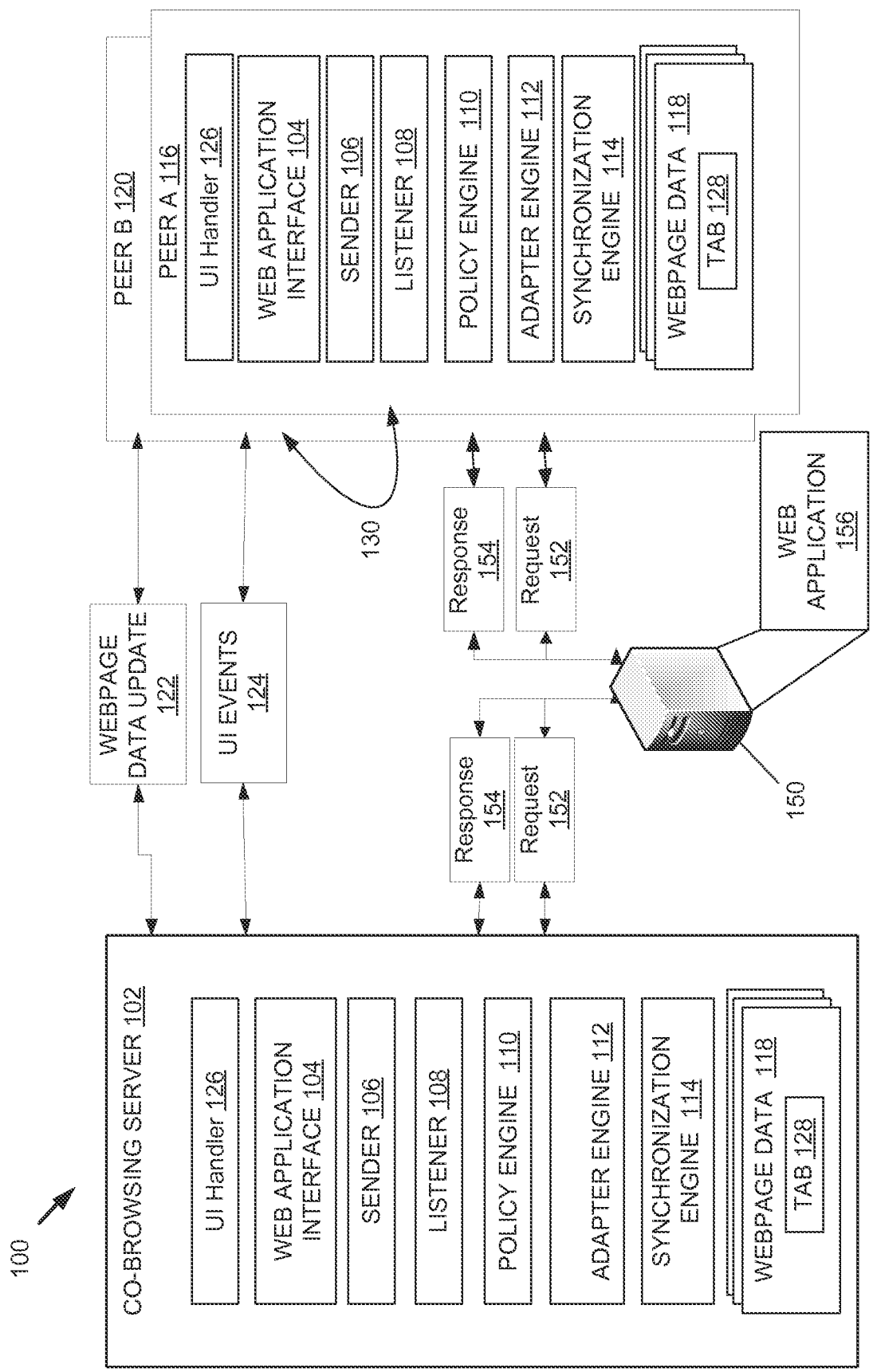
FIG. 1 schematically illustrates a system for co-browsing, which may include multi-tab co-browsing.

FIG. 1 schematically illustrates a system for co-browsing 100, which may include multi-tab co-browsing. The system 100 includes a co-browsing server 102, a custom website 150, peer A 116, peer B 120, webpage updates 122, user interface (UI) events 124, requests 152, and responses 154. The co-browsing server 102 may include a user interface (UI) handler 126, a web application interface 104, sender 106, listener 108, a policy engine 110, an adapter engine 112, a synchronization engine 114, and webpage data 118. Peers A 116 and B 120 may include a UI handler 126, a web application interface 104, sender 106, listener 108, a policy engine 110, an adapter engine 112, a synchronization engine 114, and webpage data 118. Peers 116, 120 and co-browsing server 102 may not include some of the functionality and modules disclosed.

Peer A 116 may send and receive webpage data updates 122 and/or UI events 124. Peer B 120 may send and receive webpage data updates 122 and/or UI events 124. The co-browsing server 102 may receive webpage updates 122 and/or UI events 124 from peer A 116 or peer B 120, and, in response, send webpage data updates 122 and/or UI events 124 to peer A 116 or peer B 120. The co-browsing server 102 may process the webpage data updates 122 and UI events 124 before sending them to peer A 116 or peer B 120.

The co-browsing server 102 may be a remote procedure call (RPC) server 102. The co-browsing server 102 may be more than one server. The functions described in relation to the co-browsing server 102 may be provided by one or more co-browsing servers 102. In some embodiments, peer A 116 and peer B 120 may send some or all of the webpage updates 122 and UI events 124 directly to one another.

Peer A 116 and peer B 120 may be computing devices. Peer A 116 and peer B 120 may be peers to one another or may have a master slave relationship. Peer A 116 and peer B 120 may be on separate computing devices or on a same computing device. A person (not illustrated) may be a user of peer A 116 or peer B 120. The user may be a visitor (not illustrated) to a custom website 150 or may be an operator (not illustrated) of the custom website 150. An operator (not illustrated) of the custom website 150 may be using either peer A 116 or peer B 120. A visitor (not illustrated) of the custom website 150 may be using either peer A 116 or peer B 120. There may be more than one peer A 116 and more than one peer B 120. In some embodiments, Peer A 116 and/or peer B 120 may include an automation module (not illustrated) that may generate events (not illustrated). For example, in some embodiments, an operator module may be included that co-browses with the visitor.

The custom website 150 may be a website running on a webserver accessible over the Internet that offers information, goods, and/or services to visitors. The custom website 150 may include the web application 156. Some examples of the web application 156 include a website of an automobile manufacture, an automotive dealer, a watch manufacturer, an educational website, a website of a local library, and a website of a broadcasting company. In some embodiments, the web application 156 may offer goods, services, or information, all of which may be for sale. The requests 152 may be requests 152 to the web application 156 from peer A 116, peer B 120, or co-browsing server 102. The responses 154 may be responses from the web application 156 to peer A 116, peer B 120, or co-browsing server 102.

The web application interface 104 may access a web application 156 where peer A 116 and peer B 120 co-browse. For example, the web application interface 104 may be Internet Explorer® (IE) or Chrome®. The web application interface 104 may render webpage data 118 in order to present webpage data 118 to the user.

The webpage data 118 may be data for a webpage such as a document object model (DOM®). The DOM® may include a DOM® application programming interface (API) (not illustrated). The webpage data 118 may include tab 128. The tab 128 may be an indication of which tab 128 of the web application interface 104 that the webpage data 118 represents.

The UI events 124 may be a user interface event recognized by the web application interface 104, or an event (not illustrated) recognized as an event by the web application interface 104. The user interface event may be performed by the visitor or the operator. The event may be an event recognized by the web application interface 104 as an event. An event may include events as defined by the World Wide Web Consortium® (W3C). Events may include UI events 124. Examples of events include a mouse click, mouse movement, a page refresh, and receipt of an event from the web application 156.

The webpage data update 122 may be an update to the webpage data 118. The webpage data update 122 may represent the difference between webpage data 118 before an event and after the event. In some embodiments, the webpage data update 122 is the difference between the current DOM and a previous DOM. The previous DOM may have been updated to the current DOM based on an event (not illustrated). The webpage data update 122 may be sent in a JavaScript Object Notation® (JSON) format, or another format. The webpage update 122 and/or the UI events 124 may include a timestamp to indicate when the update to the webpage data 118 occurred. The webpage update 122 and/or the UI events 124 may include the identification of the intended recipient of the webpage update 122 or UI events. The webpage data update 122 may include Javascript® or another script from another language that was executed on the webpage data 118 as a result of the event. The request 152 sent to the web application 150 as a result of the event may be included in the webpage data update 122. For example, a XMLHttpRequest (XHR) that resulted from the event may be included with the webpage data update 122. In some embodiments, the webpage data update 122 may include a precedence of the peer 116, 120 that sent the webpage data update 122.

The synchronization engine 114 may be configured to determine webpage data update 122 based on webpage data 118 changing as a result of an event. For example, a user may click on a button, which is an event, and the web application interface 104 may send the button click to the web application 156, which returns updates of the webpage data 118. The webpage data 118 may be updated by the web application interface 104. The synchronization engine 114 may determine the difference between the webpage data 118 before the button click and after the button click and generate webpage data update 122 that indicates the difference. The difference may be determined before the webpage data 118 is rendered by the web application interface 104 or after the webpage data 118 is rendered by the web application interface 104.

The synchronization engine 114 may be configured to take the webpage data update 122 and update the webpage data 118 to reflect the webpage data update 122. In some embodiments, the synchronization engine 114 may decode the webpage data update 122 which may be in JSON format and apply the webpage data update 122 to the webpage data 118. In some embodiments, the synchronization engine 114 uses core levels 1, 2, 3, 4, 5, or subsequent level of a DOM API. The synchronization engine 114 may be configured to discard changes to webpage data 118 when a webpage data update 122 is received from a peer 116, 120 with a higher precedence than the peer 116, 120 of the synchronization engine 114, and to make the changes to the webpage data 118 indicated in the webpage data update 122.

A peer 116, 120 or the co-browsing server 102 may be configured to determine which tab 128 a webpage data update 122 or UI events 124 is for. The peer 116, 120 or the co-browsing server 102 may be configured to determine the tab 128 based on activity of the webpage data updates 122 or UI events 124, or the webpage data update 122 or UI events 124 may indicate a tab 128.

The adapter engine 112 may be configured to adapt webpage data updates 122 and UI events 124 for a peer 116, 120 from one format to a second format. For example, webpage data updates 122 from peer A 116 may be in a format for Internet Explorer®, and the adapter engine 112 may adapt the webpage data updates 122 into a format for Chrome® for peer B 120.

The UI handler 126 may be configured to handle UI events 124 and to handle UI events 124 on peer A 116 and peer B 120. The UI handler 126 may be configured to take the UI events 124 and process the UI events 124. For example, peer A 116 may indicate that a user has selected or clicked a button in UI events 124 that is sent to the co-browsing server 102, and then sent to peer B 120. The UI handler 126 may replicate the UI events 124 for the web application interface 104 so that the web application interface 104 mirrors the clicking or selection of the button on peer A 116.

In some embodiments, the UI handler 126 will simulate the UI events 124 so that the web application interface 104 will update the webpage data 118 according to the UI events 124. The synchronization engine 114 may then determine the webpage data update 122 based on the UI events 124 and send the webpage data update 122 to the sender of the UI events 124. In this way, one peer 116, 120 may act as a master peer 116, 120 and another peer 116, 120 may act as a slave peer where the slave peer 116, 120 sends UI events 124 and receives webpage data updates 122, and the master peer 116, 120 receives UI events 124 and sends webpage data updates 122. The user of the mater peer 116, 120 may initiate events on the master peer 116, 120 and then send webpage data updates 122 based on the events.

The sender 106 may be a sockets program or a program capable of publishing peer network links that sends webpage data updates 122 and UI events 124. The sender 106 may send requests to the custom website 150. The sender 106 of peer A 116 or peer B 120 may be configured to send webpage data updates 122 and UI events 124 to peer A 116 or peer B 120 directly rather than sending the webpage data updates 122 and UI events 124 to a co-browsing server 102.

The listener 108 may be a sockets program that listens for webpage data updates 122 and UI events 124. In some embodiments, the listener 108 is a program capable of publishing peer network links that listens for webpage updates 122 and UI events 124. The listener 108 may listen for data from the web application 156.

In some embodiments, the peers 116, 120 may set up a socket communication with sender 106 and listener 108. In some embodiments, peers 116, 120 may query other peers 116, 120 for webpage data updates 122 and UI events 124. In some embodiments, peers 116, 120 may communicate 130 with one another without going through the co-browsing sever 102.

The policy engine 110 may be configured to resolve conflicts between peer A 116 and peer B 120 in co-browsing. For example, if peer A 116 and peer B 120 select different items simultaneously or approximately simultaneously or before the updates or event has been processed while co-browsing then the policy engine 110 may determine which, if either, of the selections should be sent to the other peer 116, 120. The policy engine 104 may have precedence where peer A 116 and peer B 120 are ranked. The policy engine 104 may resolve conflicts based on the precedence of peer A 116 and peer B 120.

In some embodiments, the functionality described in user interface (UI) handler 126, web application interface 104, sender 106, listener 108, policy engine 110, adapter engine 112, and synchronization engine 114, may be grouped differently. Additionally, peer A 116, peer B 120, and co-browsing server 102 may include only some of the functionality described. In some embodiments, the functionality may be divided among or between peer A 116, peer B 120, and co-browsing server 102. For example, peer A 116 may partially adapt a webpage data update 122, and the co-browsing server 102 or peer B 120 may partially adapt the webpage data update 122. In another example, peer A 116 may have no adapter engine 112 while peer B 120 and the co-browsing server 102 do have adapter engines 112. In some embodiments, some or all of the functionality of the co-browsing server 102 may be merged with an operator.

In some embodiments, one or more of the user interface (UI) handler 126, web application interface 104, sender 106, listener 108, policy engine 110, adapter engine 112, and synchronization engine 114, may be implemented by including a single line in the web application interface 104. In some embodiments, more than a single line is used. In some embodiments, no installation is necessary beyond adding code to the web application 156. This may provide the advantage that a web application 156 may be enabled for co-browsing according to one or more of the disclosed embodiments by only adding lines to a web application 156.

Figure 2:
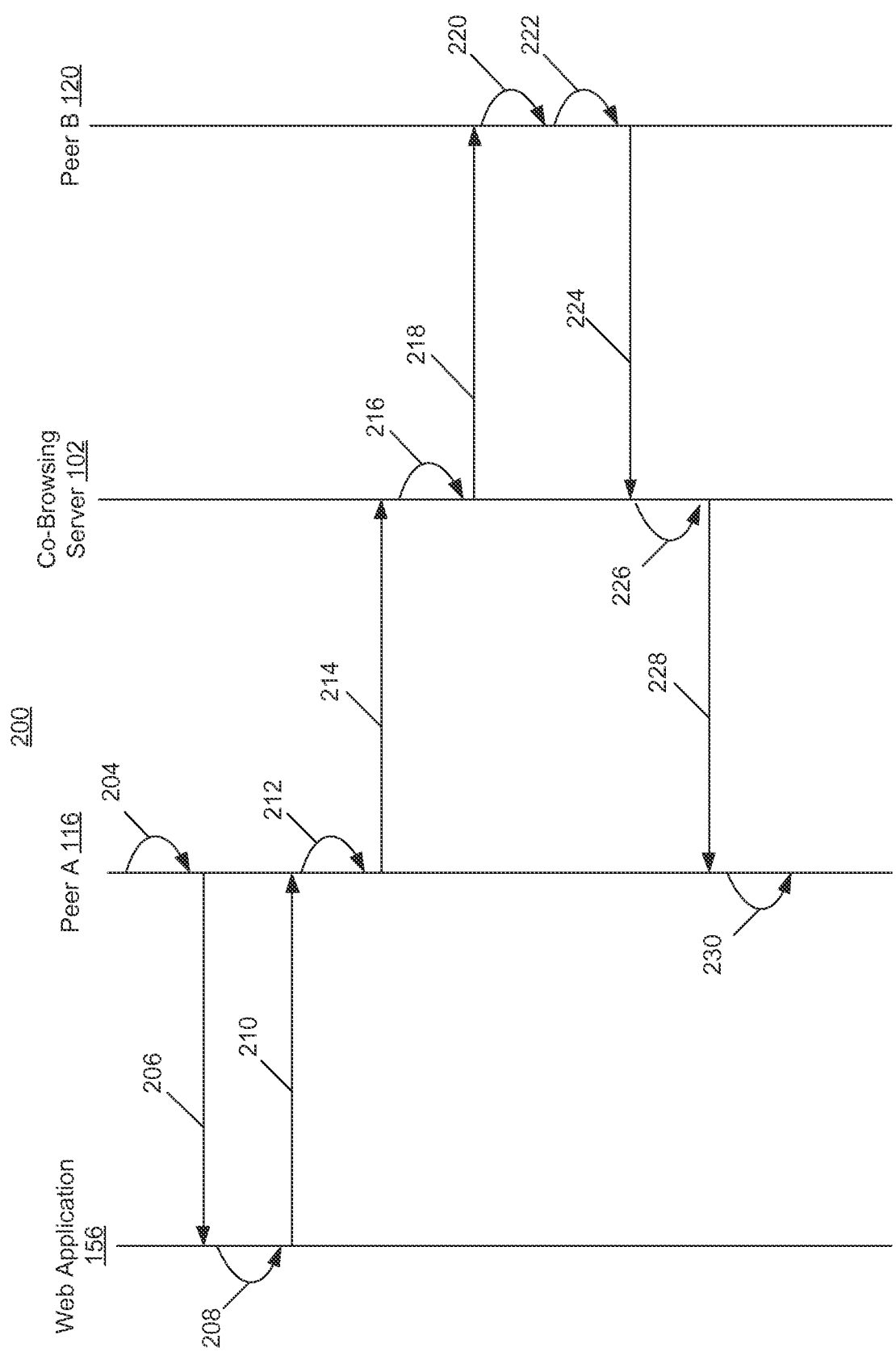
FIG. 2 schematically illustrates an example of the operation of the system for multi-tab co-browsing according to some disclosed embodiments.

FIG. 2 schematically illustrates an example 200 of the operation of the system for multi-tab co-browsing 100 according to some disclosed embodiments. Illustrated in FIG. 2 are web application 156, peer A 116, co-browsing server 102, and peer B 120.

The example 200 is discussed in conjunction with FIG. 1. The example 200 begins at 204 where peer A 116 may make a UI selection such as moving a mouse (not illustrated) over a button and selecting or clicking a button displayed on a webpage (not illustrated). The web application interface 104 of peer A 116 may interpret the moving of the mouse and the selection of the button. The example 200 continues at 206 where peer A 116 sends a hypertext transfer protocol (http) request 152 to the web application 156 that indicates the selection of the button. In some embodiments, the http request 152 may be a hypertext transfer protocol secure (https). The example 200 continues at 208 where the web application 156 may respond to the http request 152 that indicates the selection of the button by generating an http response 154. The example 200 continues at 210 where the web application 156 may send the http response 154 to peer A 116. The example 200 continues at 212 where the web application interface 104 of peer A 116 may integrate the http response 154 into the webpage data 118 of peer A 116. The web application interface 104 of peer A 116 may add two new buttons and remove an image as a result of the button selection. Continuing at 212, the synchronization engine 114 may determine the difference between the webpage data 118 before the selection of the button and after selection of the button. The synchronization engine 114 may generate webpage data update 122 which indicates the difference between the webpage data 118 before the selection of the button and after selection of the button. The synchronization engine 114 may determine the difference before the new webpage is rendered by the web application interface 104 of peer A 116 or after the new webpage is rendered by the web application interface 104 of peer A 116.

The example 200 continues at 214 where the peer A 116 sends the webpage data update 122 to the co-browsing server 102. The example 200 continues at 216 where the listener 108 of the co-browsing server 102 may receive the webpage data update 122. In some embodiments, the adapter engine 112 of the co-browsing server 102 may adapt the webpage data update 122 for peer B 120. For example, the web application interface 104 of peer B 120 may be IE® and the web application interface 104 of peer A 116 may be Chrome®. The adapter engine 112 of the co-browsing server 102 may adapt the webpage data update 122 from IE® to Chrome®. In some embodiments, the adapter engine 112 of the peer A 116 or peer B 120 may adapt the webpage data update 122 for peer B 120.

The example 200 continues at 218 where the co-browsing server 102 sends the webpage data update 122 to peer B 120. The example 200 continues at 220 where the listener 108 of peer B 120 may receive the webpage data update 122. The synchronization engine 114 of peer B 120 may adapt the webpage data 118 with the webpage data update 122. The web application interface 104 of peer B 120 may then render a new webpage based on the updated webpage data 118. Thus, the changes to the webpage data 118 of peer A 116 may be mirrored in the webpage data 118 of peer B 120.

The example 200 continues at 222 where a user moves a mouse of peer B 120 that moves a cursor to a different location on a screen (not illustrated) of peer B 120. The UI handler 126 generates a UI event 124 that indicates the movement of the cursor. The example 200 continues at 224 with the sender 106 of peer B sending the UI events 124 to the co-browsing server 102. The example 200 continues at 226 with the listener 108 of the co-browsing server 102 receiving the UI events 124. The co-browsing server 102 may adapt the UI events 124 for peer A 116.

The example 200 continues at 228 with the co-browsing server 102 sending the UI events 124 to peer A 116. The example 200 continues at 230 with the listener 108 of peer A 116 receiving the UI events 124. In some embodiments, peer A 116 may adapt the UI events 124 received from the co-browsing server 102 prior to applying them. The UI handler 126 of peer A 116 then may apply the UI events 124 to the webpage data 118 of peer A 116. The UI handler 126 may move the cursor (not illustrated) of peer A 116 to the same position as in peer B 120. In some embodiments, if the UI events 124 sent from peer B 120 to peer A 116 had included events that required changing the webpage data 118, such as a mouse click, then peer A 116 may implement the events in the UI events 124 and send a webpage data update 122 to peer B 120 indicating the changes in webpage data 118 as a result of UI events 124. In some embodiments, the operator, for example peer B 116, and visitor, for example peer A 120, may each have separate cursors so that there may be dual cursors.

Thus, in the example 200 the changes made to the webpage data 118 of peer A 116 are sent to peer B 120, and UI events 124 may be sent from peer B 120 to peer A 116. In a similar fashion, peer A 116 may send UI events 124 to peer B 120, and peer B 120 may send webpage data 122 to peer A 116.

Thus, peer A 116 and peer B 120 may co-browse the web application 156.

Figure 3A:
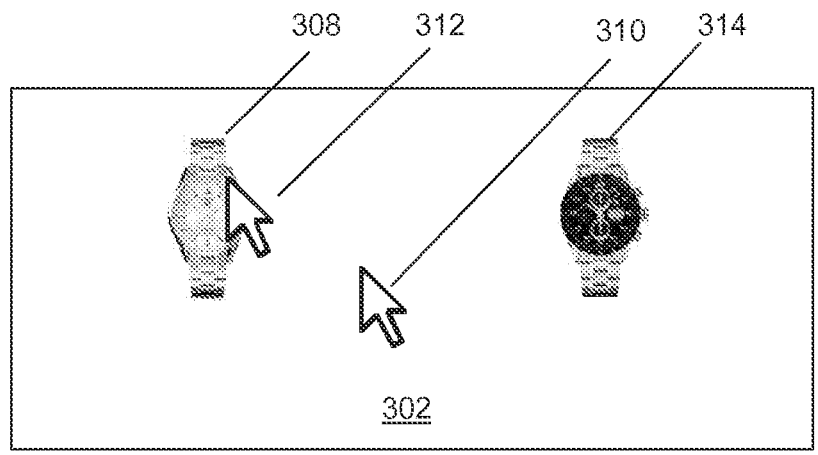
FIGS. 3A, 3B, and 3C schematically illustrate an example of the operation of the system for multi-tab co-browsing according to some disclosed embodiments.
Figure 3B:
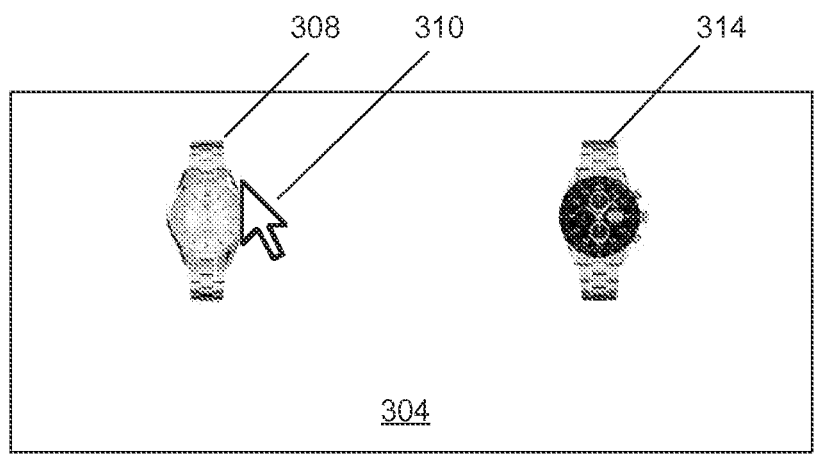
Figure 3C:
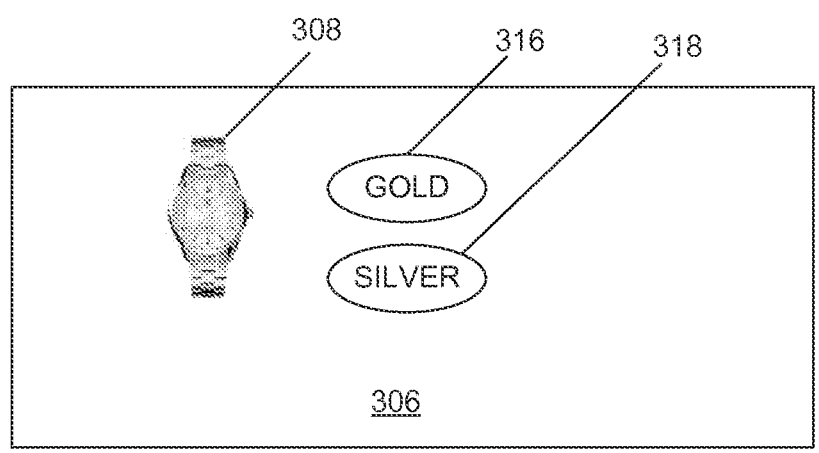

FIGS. 3A, 3B, and 3C schematically illustrate an example of the operation of the system for co-browsing 100 according to some disclosed embodiments. FIGS. 3A, 3B, and 3C schematically illustrate a webpage 302, 304, 306 of web application 156. FIG. 3A illustrates an image of a first watch 308, a cursor in a first position 310, a cursor in a second position 312, and a second watch 314. The user of the web application 156 may move the cursor from the first position 310 to the second position 312 by, for example, moving a mouse, using a touchpad, using a stylus, or by touching a touchscreen. FIG. 3B illustrates the webpage 302 after the cursor has moved from the first position 310 to the second position 312. The user then selects the first watch 308 by making a selection by, for example, clicking a mouse or touching a touchscreen or touchpad.

FIG. 3C illustrates the first watch 308, a button for selecting gold 316, and a button for selecting silver 318. After the user selects the first watch 308 in FIG. 3B, the webpage 304 is updated by deleting the second watch 314 and adding a button for selecting silver 318, and a button for selecting gold 316.

Figure 4A:
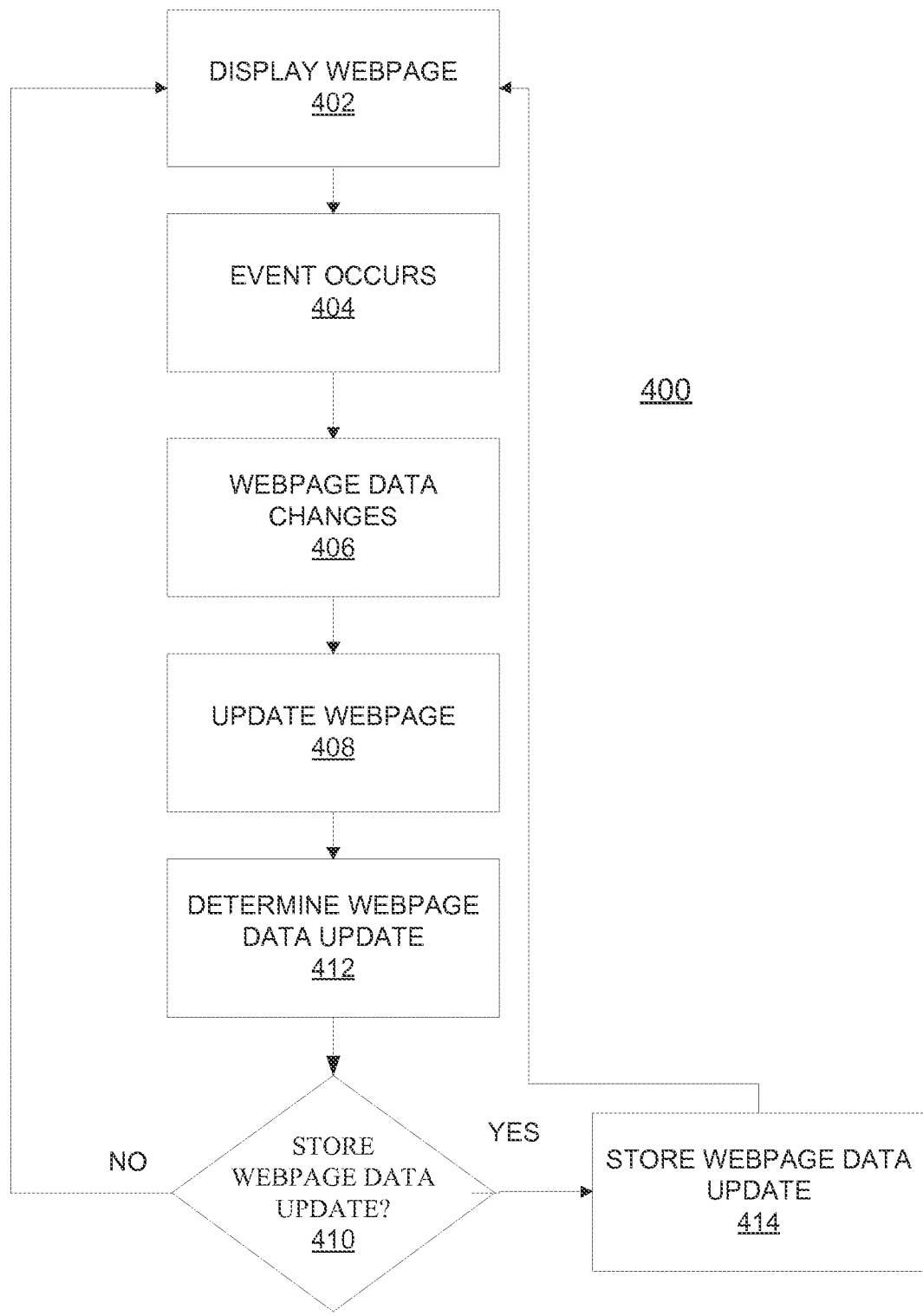
FIGS. 4A and 4B illustrate a method for updating a webpage and storing webpage data updates 122.
Figure 4B:
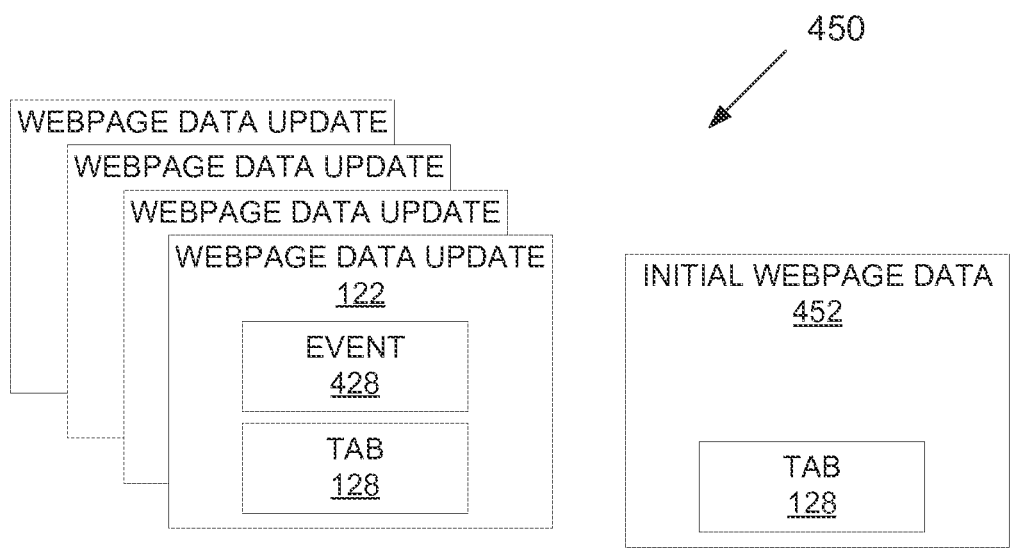

FIGS. 4A and 4B illustrate a method for updating a webpage and storing webpage data updates 122. FIGS. 4A and 4B are discussed in conjunction with FIGS. 3A, 3B, and 3C. Illustrated in FIG. 4B are webpage data update 122, which may include event 428 and tab 128. The event 428 may be an indication of the event that caused the webpage data update 122 and the tab 128 may be the active tab of the web application interface 104. The method 400 begins at 402 with display webpage 402. A webpage 402 may be displayed by a web application interface 104 with associated webpage data 118. For example, webpage 302 may be rendered from webpage data 118 and displayed for consumption of a user. The method 400 continues at 404 with event occurs. An event 428 has occurred. For example, a user may move the cursor from the first cursor position 310 to the second cursor position 312 (FIG. 3A). In another example, the user may make a selection as illustrated in FIG. 3B. The selection of first watch 308 may invoke one or more requests 152 and responses 154 between the peer 116, 120, and the web application 156. Moving the cursor may not require requests 152 and responses 154.

The method 400 continues at 406 with webpage data changes. For example, the webpage data 118 may be updated to indicate that the cursor position is now the second cursor position 312.

The method 400 continues at 408 with update webpage. The web application interface 104 may render a new webpage based on the webpage data change. For example, web application interface 104 may render webpage 304 (FIG. 3B) from the updated webpage data 122 (not illustrated).

The method 400 may continue at 412 with determine webpage data update. The webpage data update 122 may be determined by, for example, peer A 116 peer B 120, or co-browsing server 102. The webpage data update 122 may be data that indicates the difference between the webpage 402 and the updated webpage 408. In some embodiments, the webpage data update 412 may be determined based on the difference between the rendered webpages, for example, webpage 302 (FIG. 3A) and webpage 304 (FIG. 3B). In some embodiments, the webpage update 412 may be determined based on the difference between the webpage data 118 and the updated webpage data (not illustrated).

The method 400 continues at 410 with "store webpage update?" The webpage data update 122 may be stored or the method 400 may return to webpage 402. It may be determined whether to store the webpage data update 122 based on how much has changed. For example, in moving the cursor from the first cursor position 310 to the second cursor position 312 many events 428 may have been received. The method 400 may aggregate the changes to the webpage data update 414 to be stored with the next webpage data update 414. The method 400 may determine whether or not how much has changed is above a threshold level. The threshold level may be a predetermined value or determined dynamically based on one or more of storage space, communication time, communication packet size, or delay times.

The method 400 may continue with store webpage data update 414 if it is determined at 410 to store the webpage data update 122. The webpage data update 122 may be associated with a tab 128 of a web application interface 104, and may store one or more events associated with the webpage data update 122 locally. In some embodiments, the webpage data update 122 may be stored by sending the webpage data update 122 to another peer 116, 120 or by sending the webpage data update 122 to the co-browsing server 102.

The method 400 may be carried out by peer A 116, peer B 120, or co-browsing server 102. In some embodiments, portions of the method 400 are carried out by peer A 116 or peer B 120, and the other portions of the method 400 are carried out by co-browsing server 102.

FIG. 4B schematically illustrates webpage data 450 being stored. The webpage data 450 may include webpage data updates 122 and initial webpage data 452. In some embodiments, a webpage data update 122 may be stored for each event 408. In some embodiments, the event 408 may be an indication of multiple events 408. In some embodiments, the webpage data update 122 may be an aggregation of the updates that occurred due to several events 408. For example, in moving a cursor across a screen the webpage 302 data update 122 may represent the entire movement of the cursor from the first position of the cursor 310 to the second position of the cursor 312. And, the event 408 may represent several events 408 of the cursor being moved across the webpage 302, or multiple events 408 may be stored. The initial webpage data 122 may be the webpage data 118 before any events 428 have occurred.

FIG. 5 schematically illustrates the co-browsing server 102 according to some disclosed embodiments. FIG. 5 illustrates peer A room 510, peer B room 550, and store and replay 575. Peer A room 510 includes tab A 632 and tab B 634. Peer B room 550 includes tab A 636, tab B 638, and tab C 640. Each of tab A 632, tab B 634, tab A 636, tab B 638, and tab C 640 may include initial webpage data 452, webpage data update 122, current webpage data 514, and UI events 124. The current webpage data 514 may be webpage data 118 that indicates the current state of the webpage.

The co-browsing server 102 may be configured to create a room for each peer 116, 120 and a tab 632, 634, 636, 638, 640 for each tab 128 that a peer 116, 120 is browsing. For example, the tabs 632, 634, 636, 638, 640 in FIG. 5 correspond to the tabs 632, 634, 636, 638, 640 in FIGS. 6A and 6B. FIG. 6A schematically illustrates the tabs 632, 634 that peer A 116 has opened in one or more web application interfaces 104. FIG. 6B schematically illustrates the tabs 636, 638, 640 that peer B 120 has opened in one or more web application interfaces 104. Peer A 116 may be currently browsing tab A 632. Peer B 120 may be currently browsing tab B 638. In some embodiments, the co-browsing web server 102 only keeps track of tabs that are being browsed from the custom website 150 or web application 156.

The co-browsing server 102 may be configured to create a room 510, 550 for a peer 116, 120 when a peer 116, 120 opens a tab 128 of custom webserver 150, and the co-browsing server 102 may be configured to create a tab 632, 634, 636, 638, 640 in the associated room 510, 550 for the tab 128 of the custom webserver 150. The co-browsing server 102 may be configured to create a tab 632, 634, 636, 638, 640 for each tab 128 of the web application 156 that the peer 116, 120 opens. The peer 116, 120 may use different web application interfaces 104.

The co-browsing server 102 may be configured to store each of the initial webpage data 452, the webpage data updates 122, the current webpage data 514, and the UI events 124. In some embodiments, the co-browsing server 102 may be configured to store all the webpage data updates 122 and UI events 124. In some embodiments, the co-browsing server 102 may be configured to store only recent webpage data updates 122 and UI events 124.

For example, peer A 116 may open tab 632 (FIG. 6A) which may be a webpage 304 (FIG. 3) or tab 128 of the custom webserver 150. Peer A 116 or the custom webserver 150 may send an indication to co-browsing server 102 that peer A 116 opened tab 632. In response, co-browsing server 102 may create peer A room 510 and tab A 632. Additionally, the co-browsing server 102 may store initial webpage data 452 which indicates the state of the tab 632 when first opened by peer A 116. The co-browsing server 102 may also store a current webpage data 514 which indicates the current state of the tab 632. The co-browsing server 102 may also store webpage data update 122 which indicate changes that are made to the tab 632. In some embodiments, every change that is made to the tab 632 is stored in the webpage data update 122 so that an operator of the web application 156 can view the browsing history of peer A 116 for tab 632.

Peer A 116 may then open tab B 634 for webpage 618. Peer A 116 or the custom webserver 150 may send an indication to co-browsing server 102 that the peer A 116 opened tab 634. In response the co-browsing server 102 may create tab B 634 in peer A room 510 with initial webpage data 122, webpage data update 122, and current webpage data 514. In a similar fashion, co-browsing server 102 may create peer B room 550, and tab A 636, tab B 638, and tab C 640.

The co-browsing server 102 may be configured to maintain a current tab 128 for each of the peers 116, 120. The co-browsing server 102 may determine a current tab for each of the peers 116, 120 based on receiving the webpage data update 122, initial webpage data 122 and current webpage data 514. The co-browsing server 102 may determine that the current tab for a peer 116, 120 is the tab 128 that last received initial webpage data 452, webpage data update 122, or current webpage data 514.

The store and replay 575 may be configured to store all or some of the webpage data updates 122 and UI events 124 and to replay the webpage data updates 122 and UI events 124. For example, an operator may request that a co-browsing web session between a visitor and operator be replayed or a web session of a visitor be replayed. The store and replay 575 may send the webpage data updates 122 and UI events 124 to the operator in so that the operator may view the co-browsing or web session. In some embodiments, the store and replay 575 may be configured to send the webpage data updates 122 and UI events 124 to the operator or visitor so that the operator or visitor can pause or speed the playing of the replaying of the web session or co-browsing session. In some embodiments, the store and replay 575 may only store and send to the visitor or operator the webpage data updates 122.

Figure 7A:
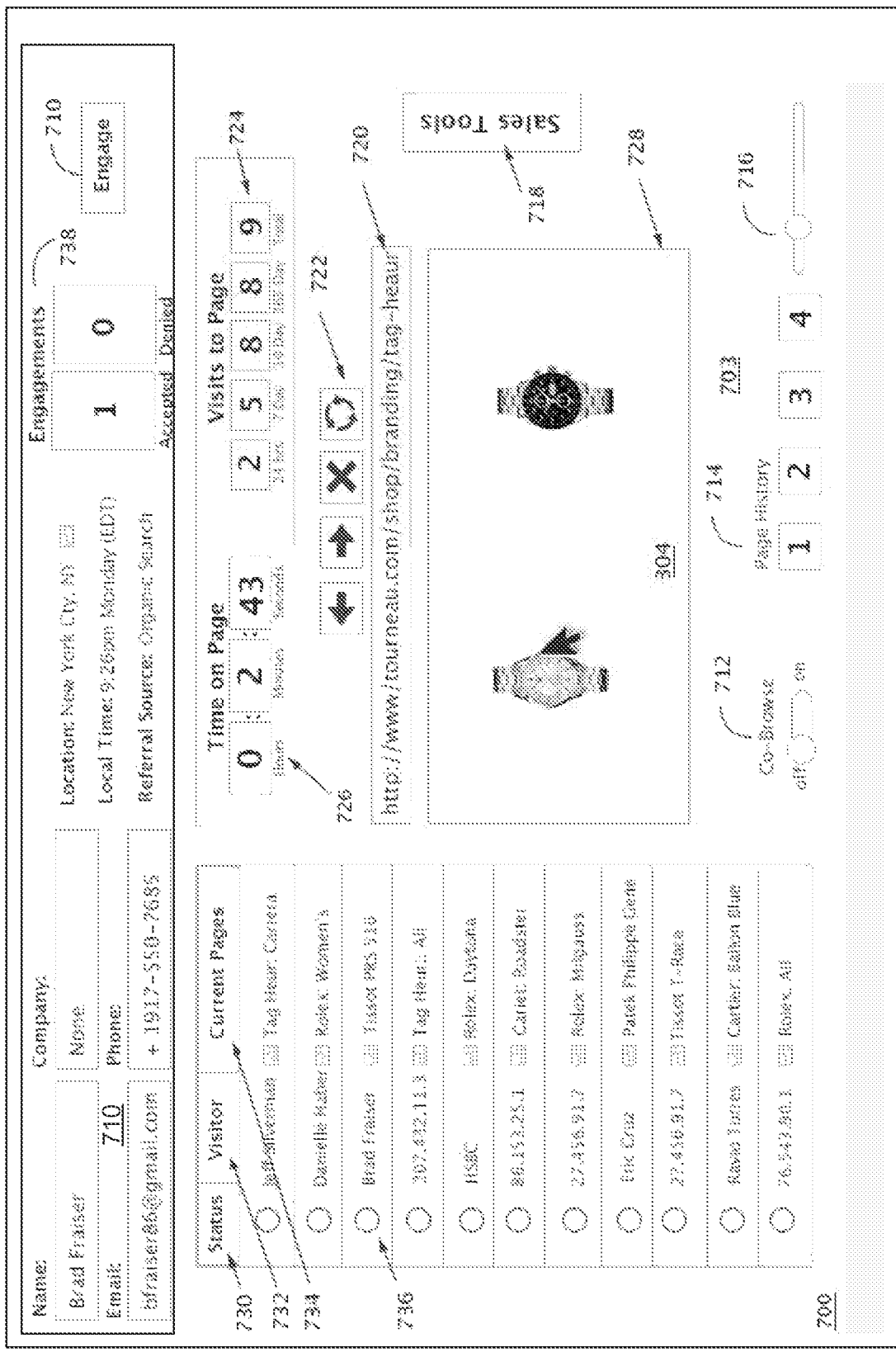
FIGS. 7A, 7B, and 7C schematically illustrate a system for multi-tab co-browsing according to some disclosed embodiments.
Figure 7B:
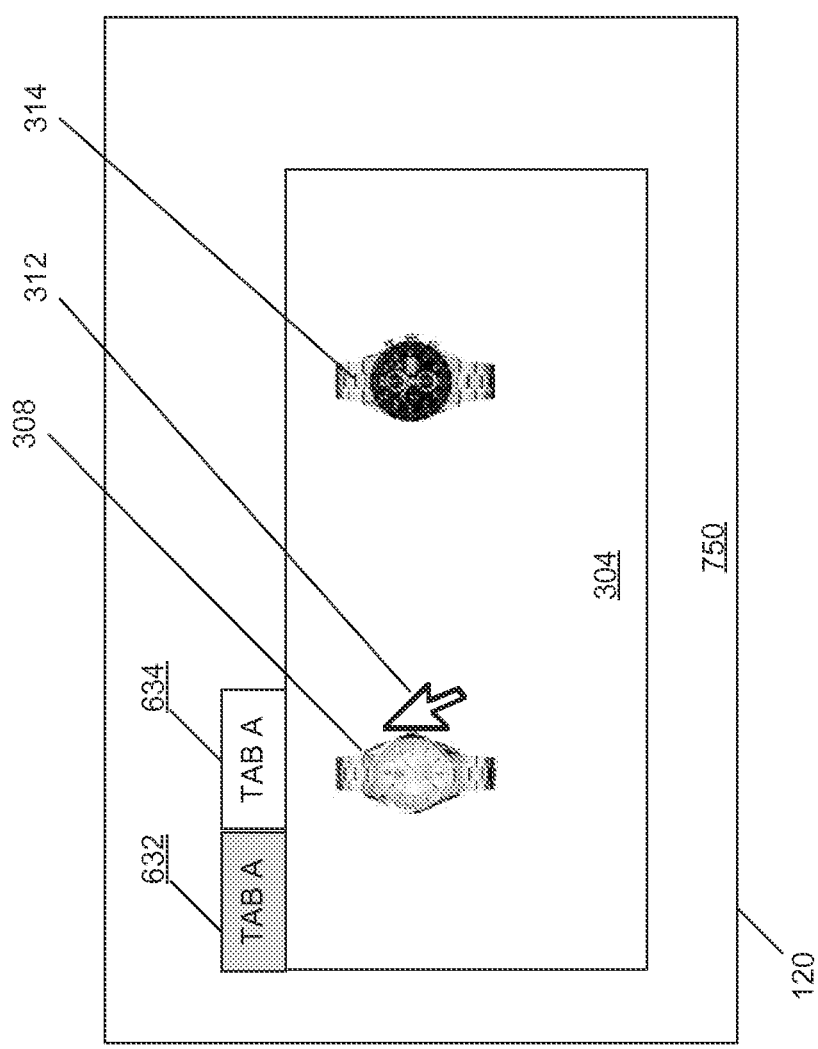
Figure 7C:
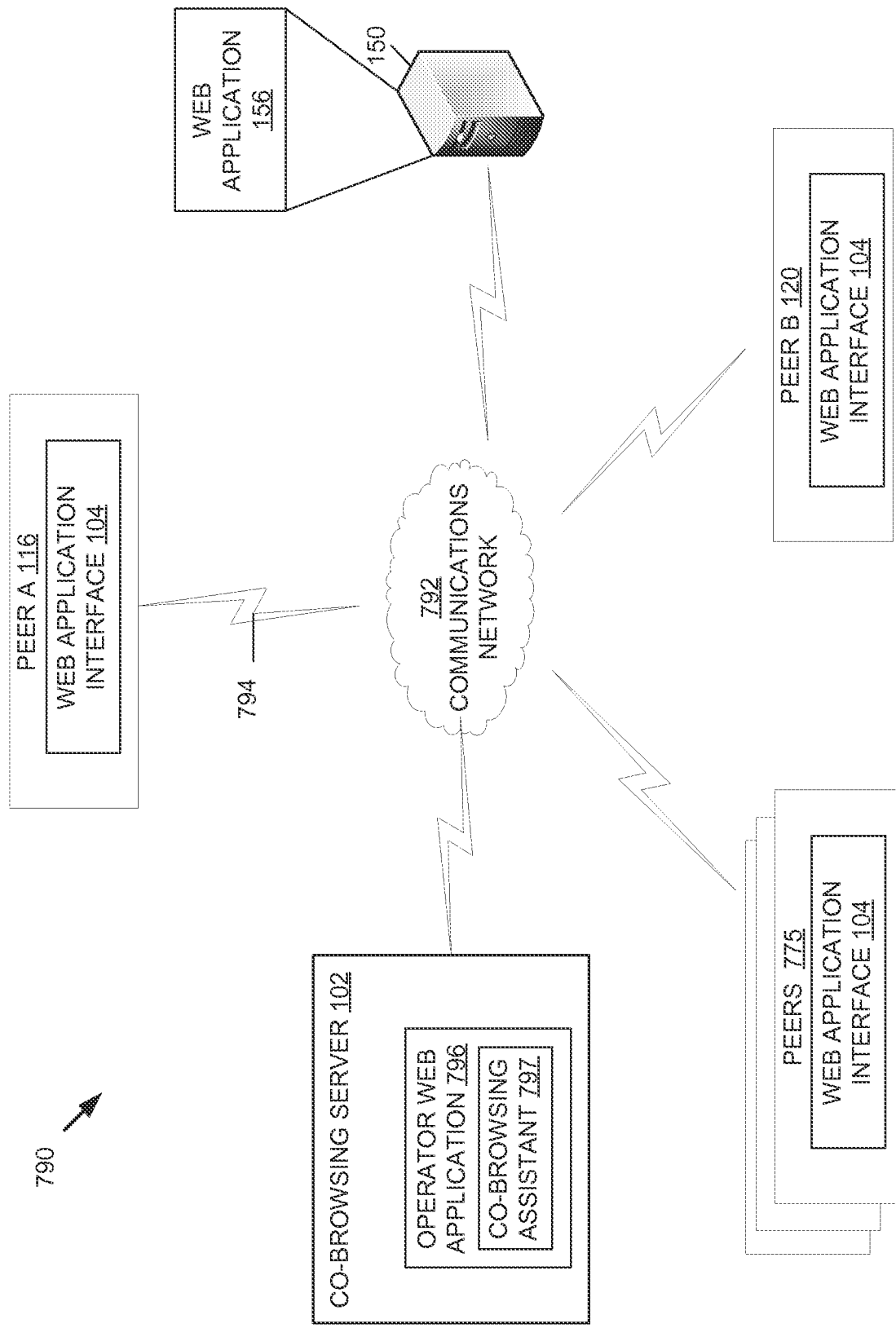

FIGS. 7A, 7B, and 7C schematically illustrate a system for co-browsing according to some disclosed embodiments. FIGS. 7A, 7B, and 7C are discussed together. Illustrated in FIG. 7A is a tab 700 of peer A 116. Illustrated in FIG. 7B is a tab 304 of peer B 120. Illustrated in FIG. 7C is co-browsing server 102, peer A 116, peer B 120, custom webserver 150, peers 775, and communications network 792.

The communications network 792 may be one or more networks including the Internet, wireless local area networks, private networks, etc. Co-browsing server 102, peer A 116, peer B 120, custom webserver 150, and peers 775 are in communicate via the communication network 792. In some embodiments, one or more of co-browsing server 102, peer A 116, peer B 120, custom webserver 150, and peers 775 may be in direct communication with one another.

FIG. 7B illustrates peer B 120 displaying tab A 632 of web application 156. The peers 775 are accessing the web application 156, but the tabs of the peers 775 are not displayed.

FIG. 7A illustrates peer A 116 displaying a tab of a web application interface 104 such Internet Explorer®. The web application interface 104 is accessing the operator web application 796. The operator web application 796 may be hosted by the co-browsing server 102, or, in some embodiments, the operator web application 796 may be hosted by another server (not illustrated). The operator web application 796 may include a co-browsing assistant 797 that may be configured to assist visitors to co-browse. For example, the co-browsing assistant 797 may generate UI events to take a visitor through a series of webpages to highlight the features of a product.

Illustrated in FIG. 7A is a visitor list 701, selected visitor information 710, a webpage control area 703, and a sales tools button 718. The visitor list 701 is a list of the visitors to the web application 156. The visitor list 701 may include information regarding the visitors. Each of the visitors may be one of the peers 775 illustrated in FIG. 7C. The information regarding the visitors may include status 730, visitor 732, and current page 734. The status 739 may indicate a current status 736. The current status 736 may indicate by a color whether the visitor is active, green, idle for a short period of time, yellow, or idle for a long period of time. In some embodiments, the status 730 may indicate whether the visitor is available for co-browsing or a likely candidate for co-browsing based on profiling the visitor for likelihood of making a purchase. In some embodiments, the status 730 may indicate whether or not the visitor is co-browsing with another operator. In some embodiments, selecting engagements 738 will provide a list of the operators that have engaged the visitor. A visitor may be a selected visitor 736.

In some embodiments, additional information may be provided regarding the visitors. For example, a number of tabs that are currently opened for the web application 156 may be included for each of the visitors.

Information 710 of the selected visitor 736 may be provided by the operator web application 796. For example, the information 710 may include name, email, company, phone, location, referral source, and engagements 738. The selected visitor's name is Brad Fraiser. The engagements 738 may be a number of accepted co-browsing engagements, illustrated as "1", and a number of rejected co-browsing engagements, illustrated as "0" or other engagement result.

The webpage control area 703 may include a time on page 726, a visits to page 724, webpage controls 722, the webpage address 720 of the co-browsed webpage 728, a co-browse button 712, a page history 714, and a page history slider 716.

The time on the page 726 may indicate the number of hours, minutes, and seconds the selected visitor 736 has been on the co-browsed webpage 728. The visits to page 724 may indicate the number of times the selected visitor 736 has visited the co-browsed page 728. For example, the visits to page 724 may indicate a number of times in the last 24 hour, illustrated as "2", a number of times visited in the last 7 days, illustrated as "5", a number of times in the last 30 days, illustrated as "8", a number of times visited in the last 365 days, illustrated as "8", and a number of times visited overall, illustrated as "9."

The webpage controls 722 may control the co-browsed webpage 728 when co-browsing is turned on. The left arrow may go back a page in the browsing history, the right arrow may go forward a page in the browsing history, "X" may stop the loading of a webpage, and the circular arrows may reload the webpage. The co-browsed webpage 728 may be the same webpage 304 as peer B is viewing (see FIG. 7B). The co-browse button 712 may turn co-browsing on and off. In the on mode, events taken by peer A 116 will be mirrored in peer 120. In the off mode, peer A 116 observes peer B 120, also the selected visitor 736 browse the webpage application 156.

The page history 714 displays where the co-browsed webpage 728 fits into the page history 714. And peer A 116 may select a different page in the page history 714 and during co-browsing the selected page in the page history 714 will be displayed as the co-browsed webpage 728. The page history slider 716 may be used to access different pages in the page history 714.

The sales tools 718 may be a button to access sales tools for peer A 116 to use to try and sell a product or service to the selected visitor 736.

Figure 8:
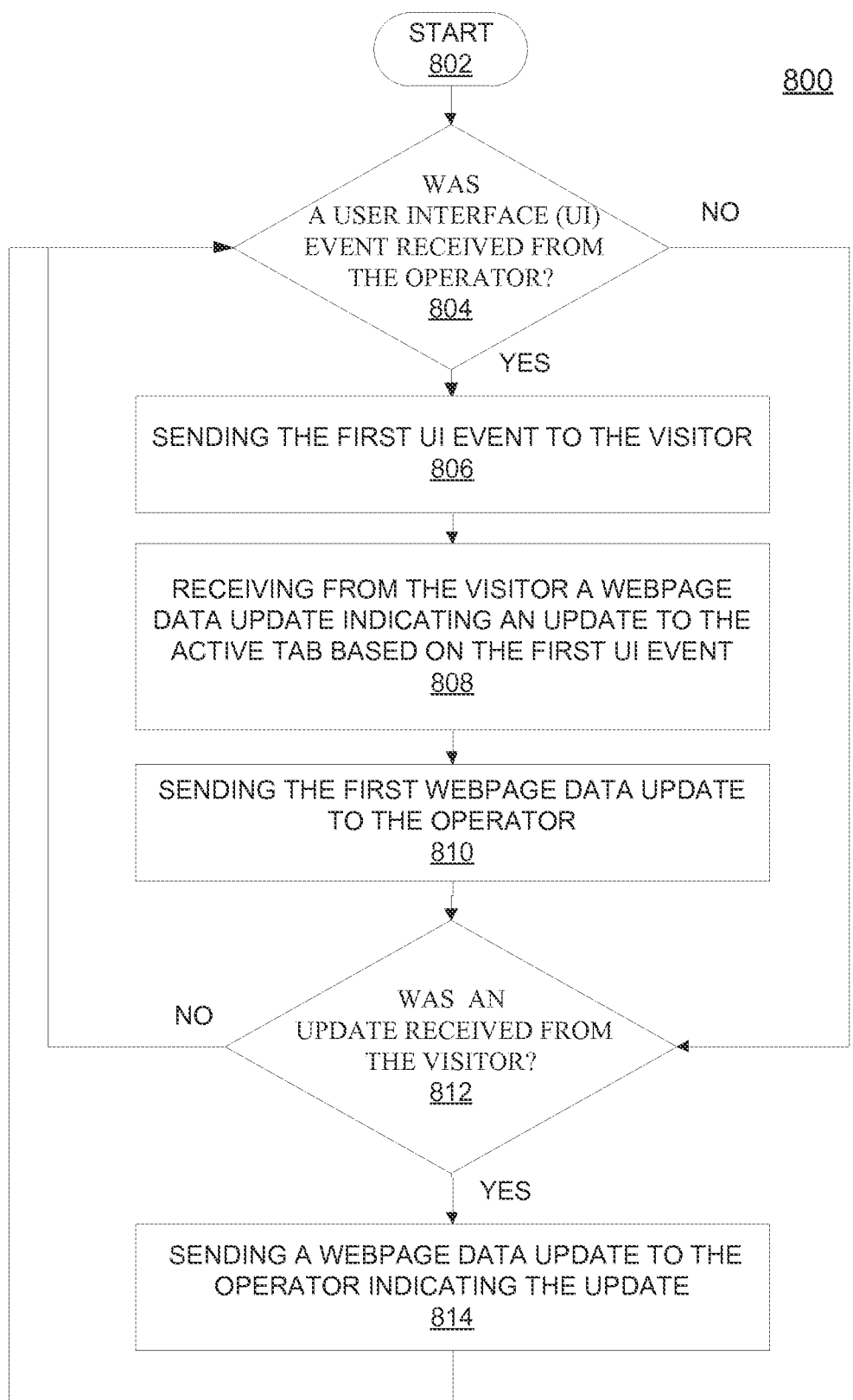
FIG. 8 schematically illustrates a method for multi-tab co-browsing according to some disclosed embodiments.

FIG. 8 schematically illustrates a method for multi-tab co-browsing according to some disclosed embodiments. The method 800 will be discussed in conjunction with FIGS. 1, 7A, 7B, and 7C. The method 800 may begin at 802 with start.

The method 800 may continue at 804 with was a user interface (UI) event received from the operator. For example, peer A 116 (FIG. 7A) may be co-browsing with peer B 120, so the co-browse button 712 would have to be switched to on. Prior to the co-browse button 712 being switched to on the operator, peer A 116, may be observing the visitor, peer B 120. The operator of peer A 116 may click the cursor 312 over the watch 308. Peer A 116 may then generate a UI events 124 that indicates the click of the cursor 312 over the watch 308. The peer A 116 may then send the UI events 124 to the co-browsing server 102.

The method 800 may continue at 806 with sending the first UI event to the visitor. For example, the co-browsing server 102 may send the UI events 124 to peer B 120. Peer B 120 may receive the UI events 124 and update the webpage data 118 (see FIG. 1) based on the UI events 124. Peer B 120 may then determine the difference between the webpage data 118 before the event in UI events 124 and after the event in UI events 124 and generate a webpage data update 122 and send the webpage update 122 to the co-browsing server 102. Note that after the click of the cursor 310 over the watch 308, the tab A would become webpage 306 (FIG. 3C).

The method 800 may continue at 808 with receiving from the visitor a webpage data update indication an update to the active tab based on the first UI event. Continuing with the example above, the webpage update 122 sent to the co-browsing server 102 indicates the update to tab A 632.

The method 800 continues at 810 with sending the first webpage data update to the operator. Continuing with the example above, the co-browsing server 102 may send the webpage update 122 to peer A 116. Peer A 116 may receive the update and update the webpage data 118 based on the webpage update 122.

The method 800 may continue at 812 with was an update received of the active tab from the visitor. If there was no update received, then method 800 may return to 804. If there was an update received of the active tab from the visitor, then the method 800 may continue at 814 with sending a webpage data update to the operator indicating the update to the active tab. Continuing with the example, the visitor at peer B 120 may now be webpage 306 and the visitor may click gold (FIG. 3C). Peer B 120 may then generate a webpage update 122 to reflect the changes in the webpage 306 after the visitor clicks gold. Peer B 120 may then generate a webpage update 122 to indicate the difference to webpage 306 after the visitor clicks gold. Peer B 120 may then send the webpage data update 122 to the co-browsing server 102. The co-browsing server 102 may adapt the webpage update 122 for peer A 116 and then send the webpage update 122 to peer A 116.

In some embodiments, an indication of the tab the webpage data update 122 regards may be sent to the operator. For example, if the visitor switches tabs, an indication of the switch may be sent to the operator. Additionally, in some embodiments, if the visitor switches tabs, webpage data may be sent to the operator for the new tab. The method 800 may end.

In some embodiments, the method 800 may include the co-browsing server 102 sending a tab to the operator. For example, the co-browsing server 102 (see FIGS. 1 and 7C) may send data to peer A 116 (FIG. 7C) of the active tab. In the example of FIGS. 7A, 7B, and 7C the active tab is tab A 632 with webpage 304 of peer B 120 (see FIG. 7B).

Figure 9:
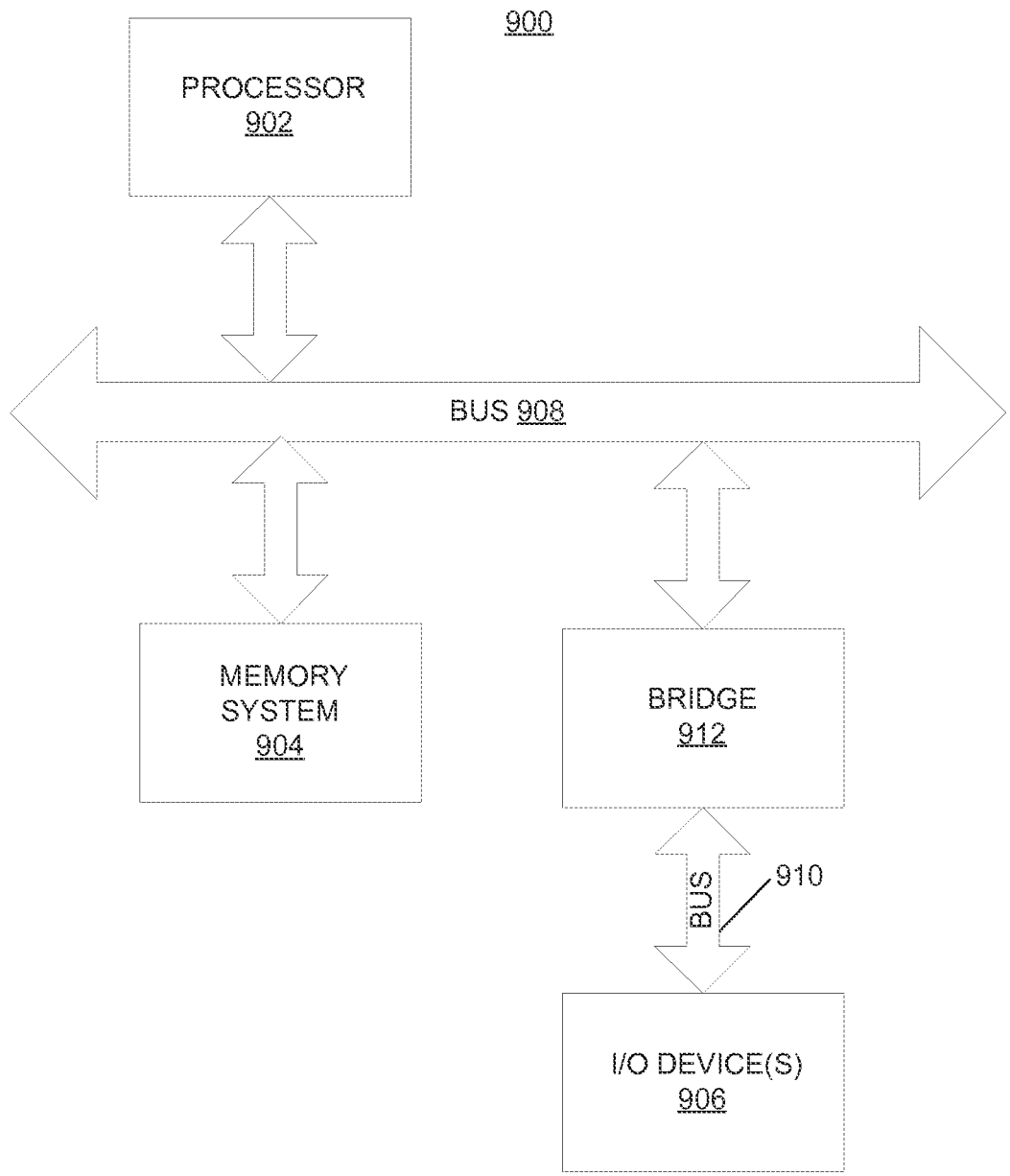
FIG. 9 is a simplified functional block diagram of a computer system.

FIG. 9 is a simplified functional block diagram of a computer system 900. The co-browsing server 102, and the peers 116, 120 may be implemented by the computer system 900 where portion of the co-browsing server 102 and peers 116, 120 may be implemented in software, hardware, or firmware. In some embodiments, the functions of the co-browser 102 and peers 116, 120 may be distributed across multiple computer systems 900.

As illustrated in FIG. 9, the computer system 900 includes one or more processors 902, one or more memory systems 904 and one or more input/output (I/O) devices 906 in communication by two communication buses 906, 908, and a bridge 912. The communication buses 906, 908 and bridge 912 may be implemented in a variety of ways and may include one or more computer buses 908, 910 and/or bridge devices 912 as shown in FIG. 9. The I/O devices 906 can include network adapters and/or mass storage devices from which the computer system 900 can receive data from the co-browsing server 102, or the peers 116, 120 for processing by the processor 902 when the computer system 800 operates as a co-browsing server 102 or peer 116, 120.

Figure 10:
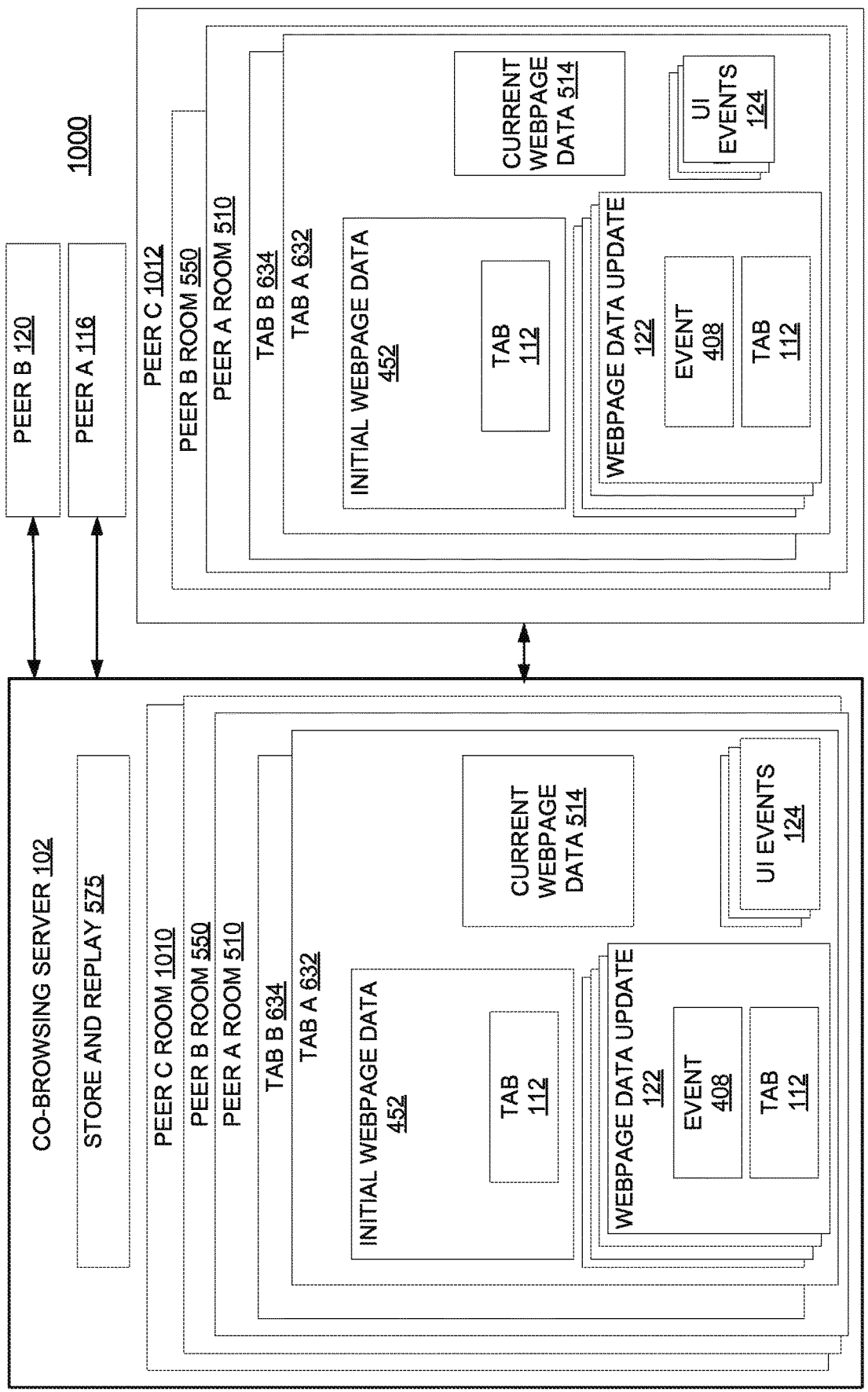
FIG. 10 illustrates a system for co-browsing 1 according to some disclosed embodiments.

FIG. 10 schematically illustrates a system for co-browsing 1000 according to some disclosed embodiments. FIG. 10 illustrates a co-browsing server 102, peer A 116, peer B 120, and peer C 1012. The custom website 150 is not illustrated but may be in communication with each of co-browsing server 102, peer A 116, peer B 120, and peer C 1012. As illustrated, peer C 1012 includes information regarding peer A 116 and peer B 120.

Peer A 116, and peer B 120 may be visitors to the web application 156. Peer C 1012 may be an operator. The co-browsing server 102 may be configured to send webpage data updates 122, initial webpage data 452, current webpage data 514, and/or UI events 124 regarding peer A 116 and peer B 120 for each opened tab 632, 634 to peer C 1012. Co-browsing server 102 may keep track of which peers 116, 120, 1012 are active on the web application 156. The co-browsing server 102 may keep track of which peers 116, 120 that peer C 1012 is observing or co-browsing with. The co-browsing server 102 may send one or more of webpage data updates 122, initial webpage data 452, current webpage data 514, and UI events 124 to peer C based on peer C being an operator of web application 156 and peer A 116 and peer B 120 being visitors to web application 156.

For example, co-browsing server 102 may send the current webpage data 514 to peer C 1012 each time that peer A 116 makes a change to a tab 632, 634, or switches to a new tab. In this way, peer C 1012 may have the current webpage data 514 for each opened tab 632, 634 of peer A 116. Then if peer C 1012 selects to observe or co-browse with peer A 116, then current webpage data 514 of the active tab of peer A 116 can be displayed to peer C 1012 without it having to be sent from co-browsing server 102. In some embodiments, the co-browsing server 102 may send the webpage data updates 122 received from the visitor peers 116, 120. In some embodiments, the co-browsing server 102 may adapt the webpage data updates 122 prior to sending them to peer C 1012.

In some embodiments, the co-browsing server 102 will send webpage data updates 122, initial webpage data 452, current webpage data 514, and/or UI events 124 regarding tabs 632, 634 for peers 116, 120 to peer C 1012 for an active tab of the visitor peers 116, 120. And, when a visitor peer 116, 120 switches tabs 632, 634, the co-browsing server 102 may be configured to send webpage data updates 122, initial webpage data 452, current webpage data 514, and/or UI events 124 regarding the new tab 632, 634 to the operator peer 1012.

In some embodiments, when an operator peer C 1012 becomes active with the operator web application 796, the co-browsing server 102 will send webpage data updates 122, initial webpage data 452, current webpage data 514, and/or UI events 124 regarding an active tab for one or more of the visitor peers 116, 120.

In some embodiments, the system 1000 has the advantage that by sending information relating to the tabs 632, 634 before they need to be displayed by a peer 116, 120, 1012 that the peer 116, 120, 1012 may not need to wait for the tab 632, 634 to be displayed.

Figure 11:
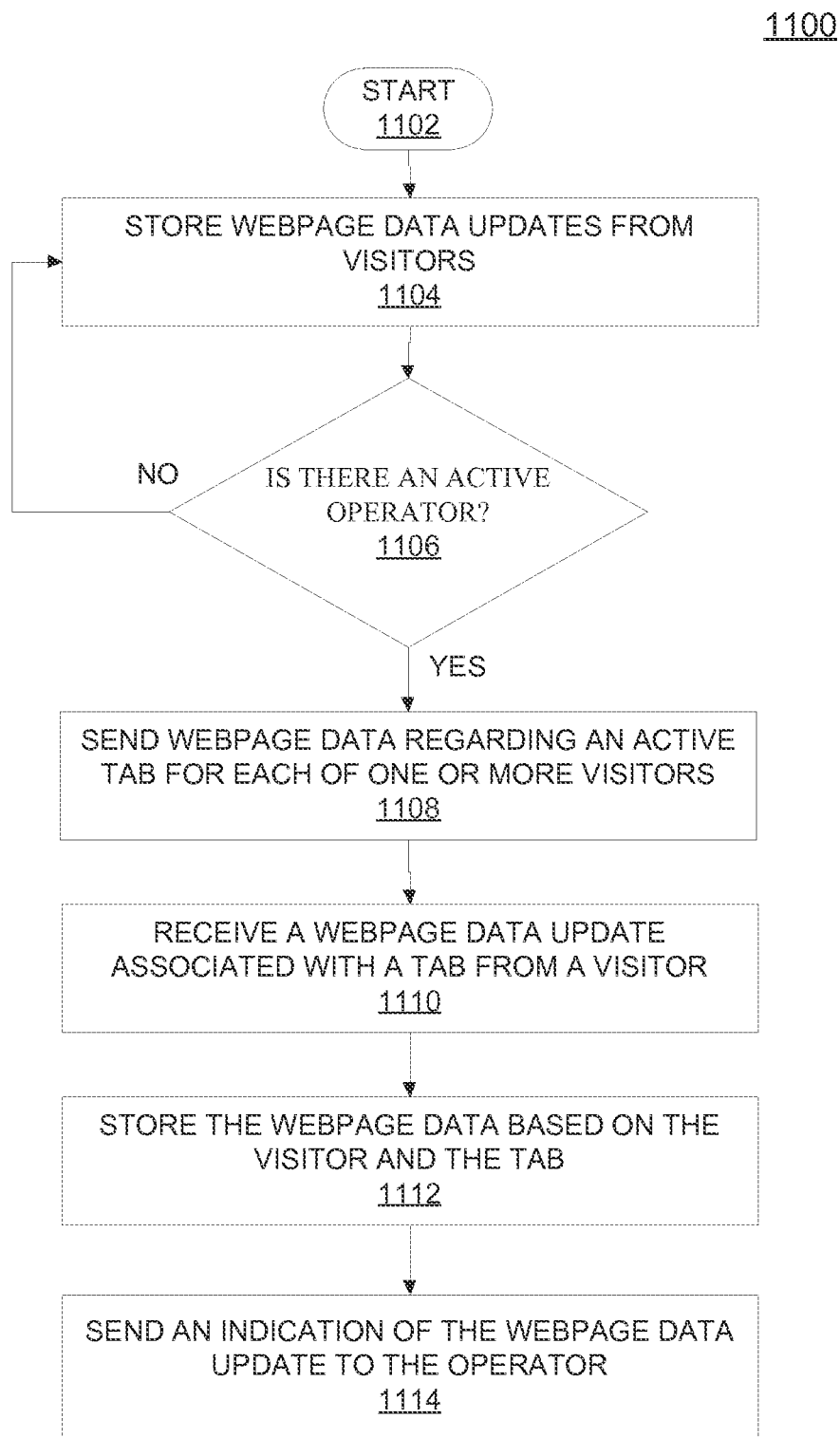
FIG. 11 schematically illustrates a method of co-browsing according to some disclosed embodiments.

FIG. 11 schematically illustrates a method of co-browsing according to some disclosed embodiments. The method 1100 will be explained in conjunction with FIGS. 1, 7, and 10. The method 1100 may begin at 1102 with start. The method 1110 may continue at 1104 with storing webpage data updates from visitors. For example, the visitor peers 116, 120 may be active with web application 150. The co-browsing server 102 may store web page data updates 122 associated with rooms 510, 550, 1010.

The method 1100 may continue at 1106 with determining whether there is an active operator. For example, the co-browsing server 102 may determine whether or not there is an active operator associated with the operator web application 796. If there is not an active operator, the method 1100 may return to 1104 with store webpage data updates from visitors.

The method 1100 may continue at 1108 with sending webpage data regarding an active tab for each of the one or more visitors. For example, the co-browsing server 102 may send current webpage data 514 for the active tab for visitor peers A, B 116, 120 to the operator peer C 1012. In some embodiments, the co-browsing server 102 may select some of the visitor peers A, B 116, 120 to send the current webpage data 514 to the operator 1012. For example, the co-browsing server 102 may select the visitor peers A, B 116, 120 based on one or more filtering criteria such as geographic location, likelihood of sales to operator peer C 1012, or a sales group of operator peer C 1012.

The method 1100 may continue at 1110 with receiving a webpage data update associated with a tab from a visitor. For example, peer A 116 may send a webpage data update 122 to the co-browsing server 102.

The method 1100 may continue at 1112 with storing the webpage data based on the visitor and the tab. For example, co-browsing server 102 may store the webpage data update 122 in a room 510 for peer A 116 and associated with a tab A 632 that is associated with the webpage data update 122.

The method 1100 may continue at 1114 with sending an indication of the webpage data update to the operator 1114. For example, continuing with the example above, the co-browsing server 102 may send the webpage data update 122 received from visitor peer A 116 to operator C 1012. In some embodiments, the co-browsing server 102 may send the current webpage data 514 instead of, or in addition to the webpage data update 122. In some embodiments, the webpage data update 122 may regard a different tab 112. The co-browsing server 122 may then send other information from the different tab 112 so that the operator 1012 will have enough information to have the current webpage data 514. For example, the co-browsing server 122 may send other webpage data updates 122 that operator peer C 1012 has not yet received from the different tab 112, or the co-browsing server 102 may send the current webpage data 514. The method 1100 may return to 1110. The method 1100 may have the advantage that information is stored for tabs 112 of visitor peers 116, 120 so that the operator peer 1012 may have the tab 112 displayed of a visitor peer 116, 120 without receiving additional information from the co-browsing server 102.

Figure 12:
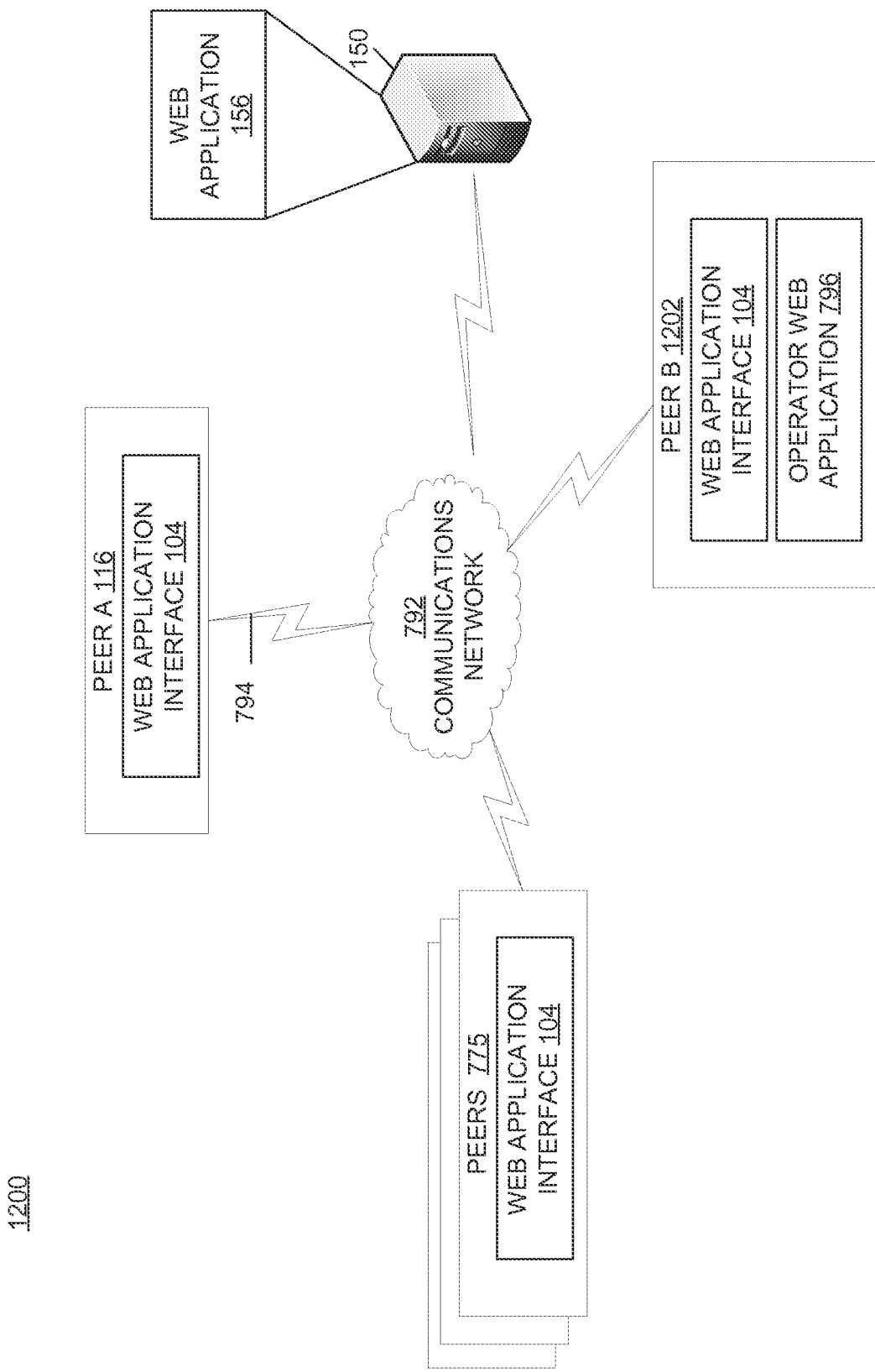
FIG. 12 illustrates a system for co-browsing according to some disclosed embodiments in which peer to peer communication is used.

FIG. 12 illustrates a system for co-browsing according to some disclosed embodiments in which peer to peer communication is used. Illustrated in FIG. 12 is peer A 116, peer B 1202, custom webserver 150, peers 775, and communications network 792. Peer A 116 and peers 775 may be a visitors to web application 156. Peer B 1202 may be an operator of web application 156. Peer B 1202 includes operator web application 796. Peer A 116 and peers 775 may communicate with peer B 1202 directly. Peer A 116 and peers 775 may communicate with peer B 1202 without the co-browsing server 102.

Figure 13:
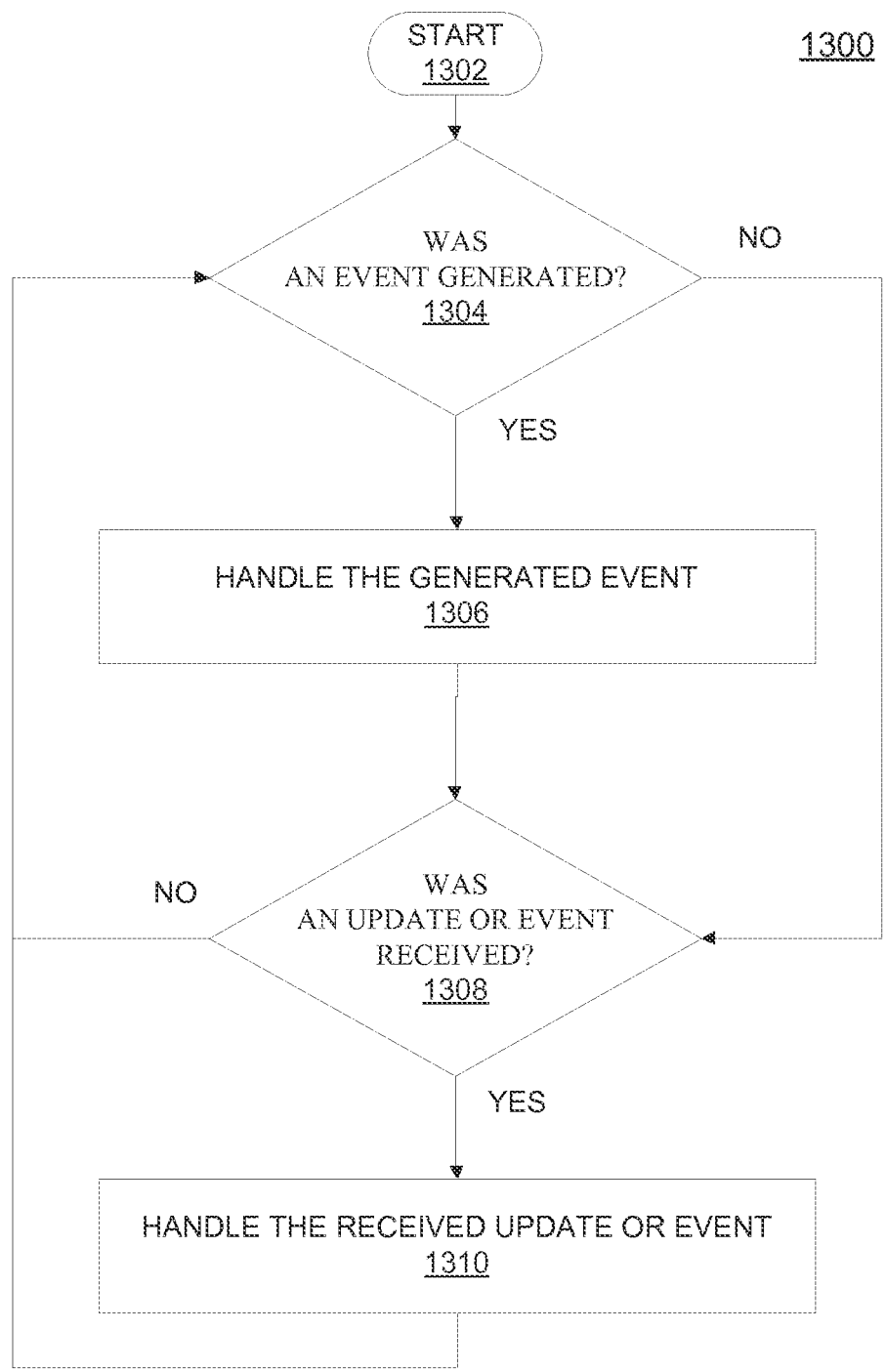
FIG. 13 illustrates a method of co-browsing according to some disclosed embodiments.

FIG. 13 illustrates a method of co-browsing according to some disclosed embodiments. The method 1300 will be disclosed in conjunction with FIG. 12. The method 1300 may begin at 1302 with start. The method 1300 may continue at 1304 with was determining whether an event was generated. For example, referring to FIG. 12, peer A 116 may be a visitor of web application 156. A user of peer A 116 may click on an item in the web application interface 104 of peer A 116. Peer A 116 may update the tab based on the event to generate an updated tab. Peer A 116 may then generate a webpage data update 122 indicating the difference between the tab and the updated tab. Peer A 116 may then send the webpage data update 122 to an operator, which may be peer B 120 (FIG. 12).

An alternative example, a user of peer B 1202 may click on an item in the web application interface 104 of peer B 1202. Peer B 1202 may send the click as a UI event 124 to peer A 116. Peer A 116 may then update the tab associated with the event based on the event in the UI event 124. Peer A 116 may then generate a webpage data update 122 indicating the difference between the tab and the updated tab. Peer A 116 may then send the webpage data update 122 to an operator, which may be peer B 1202. Peer B 1202 may then update the tab based on the received webpage data update 122 from peer A 116.

In another alternative example, a user of peer B 1202 may click on an item in the web application interface 104 of peer B 1202. Peer B 1202 may update the tab based on the event to generate an updated tab. Peer B 1202 may then generate a webpage data update 122 indicating the difference between the tab and the updated tab. Peer B 1202 may then send the webpage data update 122 to a visitor, which may be peer A 116. If an event was not generated at 1304, then the method 1300 continues at 1308.

The method 1300 may continue at 1308 with determining whether an update or event was received. For example, peer A 116 may receive a UI events 124 or webpage data update 122 from peer B 1202. Alternatively, or in addition, peer B 1202 may receive a webpage update 122 or UI events 124 from peer A 116. If an update or event was not received the method 1300 may return to 1304.

The method 1300 may continue at 1310 with handling the received update or event. For example, peer A 116, which is a visitor, may receive an UI event 124 from peer B 1202, which is an operator. Peer A 116 may then update the tab associated with the UI event 124 based on the event in the UI event 124. Peer A 116 may then generate a webpage data update 122 indicating the difference between the tab and the updated tab. Peer A 116 may then send the webpage data update 122 to an operator, which may be peer B 1202. Peer B 1202 may then update the tab based on the received webpage data update 122 from peer A 116.

Alternatively, peer A 116, which is a visitor, may receive a webpage data update 122 from peer B 1202, which is an operator. Peer A 116 may then update the tab associated with the webpage data update 122.

In another example, peer B 1202, which is an operator, may receive a webpage data update 122 from peer A 116, which is a visitor. Peer B 1202 may then update the tab associated with webpage data update 122.

In another example, peer B 1202, which is an operator, may receive a UI event 124 from peer A 116, which is a visitor. Peer B 1202 may update the tab based on the event in the UI event 124. Peer B 1202 may then generate a webpage data update 122 indicating the difference between the tab and the updated tab. Peer B 1202 may then send the webpage data update 122 to peer A 116. Peer A 116 may then update the tab based on the received webpage data update 122 from peer B 1202.

The method 1300 may return to 1304. The method 1300 may end when the operator, for example peer B 1202, stops observing or co-browsing with the visitor, for example peer A 116. Alternatively, the method 1300 may end when the visitor, for example peer A 116 stop browsing a custom website.

Figure 14:
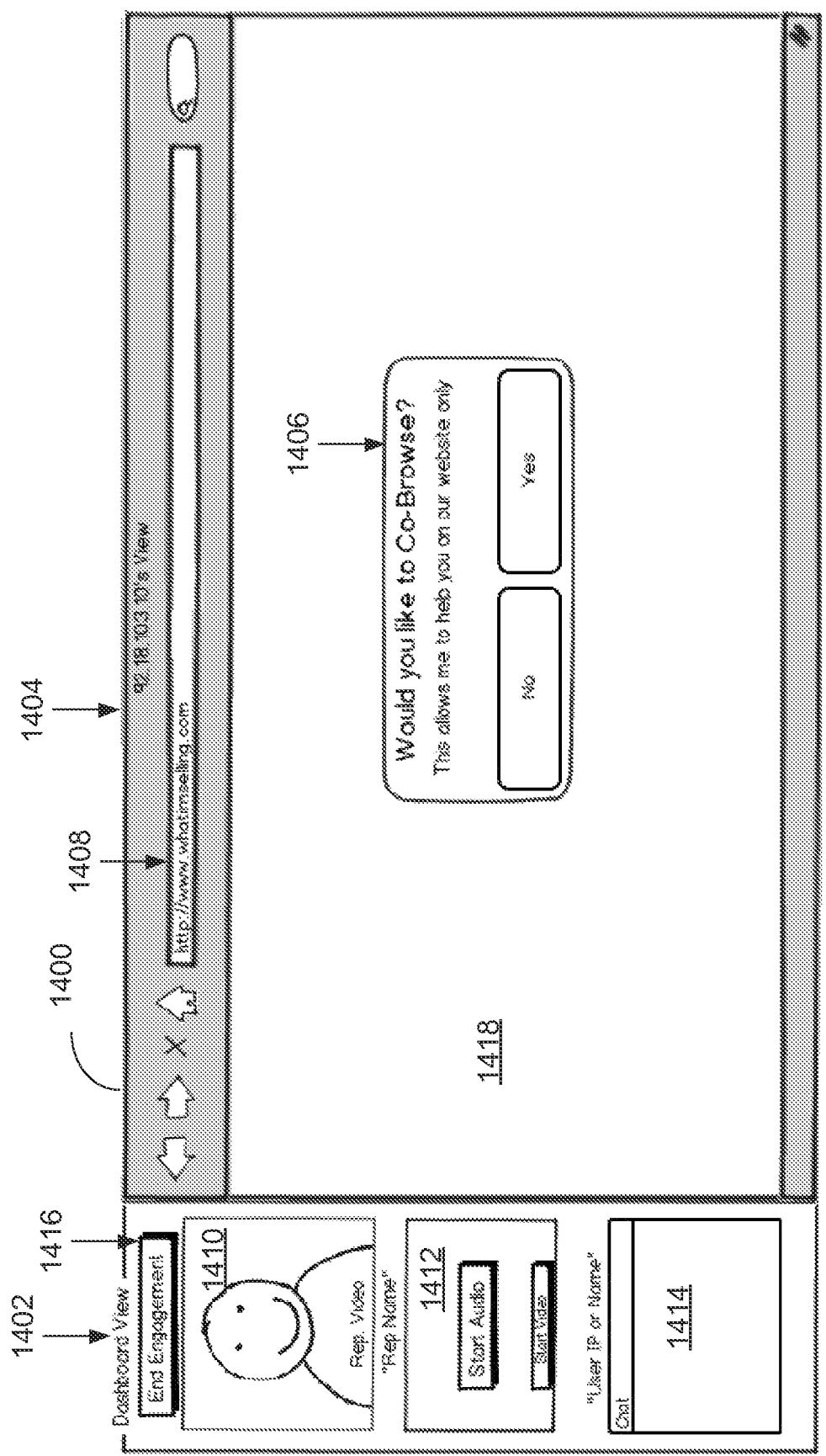
FIG. 14 illustrates a system for co-browsing according to some disclosed embodiments.

FIG. 14 illustrates a system for co-browsing according to some disclosed embodiments. Illustrated in FIG. 14 is a user interface screen 1400 that may be presented to a visitor to the web application 156. In some embodiments, the operator web application 796 may have generated the user interface screen 1400. The user interface screen 1400 may have been arrived at by an operator selecting engage 710 (FIG. 7A).

Illustrated in FIG. 14 are two main areas a communication area 1402, and the current web interface application 1404 of the visitor, for example peer B 120. As illustrated, the visitor is being requested to co-browse with the operator, for example peer A 116, in a dialogue box 1306. The tab 1418 may be tab 632 such as illustrated in FIG. 7B. The current web interface application 1404 may include the universal resource locator 1408. The communication area 1402 may include a rep video 1410, which may be a video of the operator on peer A 116. An area 1412 for video or starting audio of the visitor. And, an area 1414 for typing and receiving text. The user interface screen 1400 enables the operator, peer A 116, and visitor, peer B 120, to co-browse the web application 156 while sharing one or more of video, audio, or text of one another.

In some embodiments, the user interface screen 1400 is generated by an operator or a visitor initiating a co-browsing session and transferring the current webpage data 514 into a frame that allows the communication area 1402 to fit the tab 112. The webpage data 514 may also be adjusted within the tab 112 in order to accommodate the communication area 1402. In some embodiments, when the co-browsing session is terminated, the current webpage data 514 is transferred back to tab 112 without the communication area 1402.

Some embodiments have the advantage that a proxy server is not needed so that requests to the web application 156 may be made directly by one or more of the co-browsing server 102, peer A 116, and peer B 120 without using a proxy server.

Some disclosed embodiments provide a method of co-browsing between a visitor and an operator. The method may include sending the first UI event to the visitor, receiving from the visitor a first webpage data update indicating a first update to the active tab based on the first UI event, and sending the first webpage data update to the operator, on a condition of receiving a first user interface (UI) event regarding an active tab from the operator. The method may include sending the second webpage data update to the operator indicating the update to the active tab, on a condition of receiving a second webpage data update from the visitor indicating a second update to the active tab.

The method may include sending to the operator an indication that the active tab is changed to a new tab, and sending the third webpage data update to the operator indicating the update to the new tab, on a condition of receiving a third webpage data update from the visitor indicating a third update to a new tab.

The method may include on a condition of receiving a second user interface (UI) event regarding a new tab from the operator, sending to the visitor an indication that the active tab is changed to the new tab, sending the second UI event to the visitor, receiving from the visitor a second webpage data update indicating a second update to the new tab based on the second UI event, and sending the second webpage data update to the operator.

The method may include adapting the first webpage data update and the second webpage data update for the operator, wherein adapting comprises adapting the first webpage data update and the second webpage data update according to a first web browsing application of the visitor to a second web browsing application of the operator.

The method may include monitoring updates to one or more tabs of the visitor; and determining an active tab of the visitor based on the monitored updates, wherein the active tab is one of the one or more tabs of the visitor. The method may include sending the operator the active tab of the visitor, on a condition of receiving an indication from the operator to co-browse with the visitor. The method may include sending at least some of the monitored updates to the one or more tabs of the visitor to the operator.

The method may include storing each of the first update to the active tab and the second update to the active tab; and sending at least one of the stored updates to the operator, on a condition of receiving a request to replay an activity of the co-browsing.

The method may include receiving the first UI event and the second webpage data update at approximately the same time, and determining based on a precedence of the visitor and the operator whether to send the UI event to the visitor or send the second webpage data update to the operator.

In some embodiments, a method of co-browsing between a visitor and an operator is disclosed. The method may include on a condition of receiving a first webpage data update associated with a tab, updating the tab based on the first webpage data update. The method may include on a condition of receiving an event associated with the tab, sending a user interface event indicating the event, receiving a second webpage data update, and updating the tab based on the second webpage data update.

In some embodiments, the event may be generated by at least one of: a human or a co-browsing assistant module.

In some embodiments, the methods and apparatuses for co-browsing between one or more operators and one or more visitors has the advantage that a proxy does not have to be used for the co-browsing since the operator and visitor may either communicate directly or through the co-browsing server 102.

In some embodiments, the methods and apparatuses for co-browsing between one or more operators and one or more visitors has the advantage that software extra to the web application does not need to be installed by the operator or the visitor. In some embodiments, only extra lines of code are added to the web application of the operator and the visitor for the methods and apparatuses for co-browsing.

The methods and apparatuses provided may be implemented in a general purpose computer, a processor, or a processor core. Suitable processors include, by way of example, a general purpose processor, a graphics processing unit (GPU), a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium is a non-transitory computer-readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computer based method for observing and engaging with a website visitor, the method comprising:
   receiving, by a processor of a web-based server, a list of active visitors to a web application over a communications interface, wherein the list comprises information about the active visitors stored in a database;
   identifying, by the processor, the website visitor based on the information;
   capturing, by the processor, one or more user interface (UI) events entered by the website visitor into a first web application interface, wherein the capturing comprises determining changes to a document object model (DOM) of the web application and is transparent to the website visitor;
   transmitting, by the processor, the identity of the website visitor, the information, and the one or more UI events to a second web application interface of an operator by providing at least the determined changes to the DOM of the web application, wherein the operator can observe the one or more UI events; and
   initiating, by the processor, a co-browsing session between the operator and the website visitor, such that the website visitor can interact with the web application through the first web application interface and the operator can interact with the web application through the second web application interface in a collaborative manner.

2. The method of claim 1, further comprising:
   receiving, by the processor, a request to co-browse the web application with the website visitor from the operator over the communications interface.

3. The method of claim 2, wherein the request is received after the operator observes the one or more UI events.

4. The method of claim 2, further comprising:
   transmitting, by the processor, the request to co-browse the web application to the website visitor over the communications interface.

5. The method of claim 1, wherein the information comprises one or more of a name, email, company, phone, location, referral source, and engagement of the active visitors.

6. The method of claim 1, wherein the one or more UI events comprise one or more events recognized by the web application interface.

7. The method of claim 1, wherein the one or more UI events comprise one or more of a mouse click, mouse movement, a page refresh, and receipt of an event from the web application.

8. The method of claim 1, wherein the information is provided by the website visitor.

9. A web-based server for observing and engaging with a website visitor, the web-based server comprising:
- a processor configured to receive a list of active visitors to a web application over a communications interface, wherein the list comprises information about the active visitors stored in a database;
- the processor further configured to identify the website visitor based on the information;
- the processor further configured to capture one or more user interface (UI) events entered by the website visitor into a first web application interface, wherein the capturing comprises determining changes to a document object model (DOM) of the web application and is transparent to the website visitor;
- the processor further configured to transmit the identity of the website visitor, the information, and the one or more UI events to a second web application interface of an operator by providing at least the determined changes to the DOM of the web application, wherein the operator can observe the one or more UI events; and
- initiating, by the processor, a co-browsing session between the operator and the website visitor, such that the website visitor can interact with the web application through the first web application interface and the operator can interact with the web application through the second web application interface in a collaborative manner.

10. The web-based server of claim 9, wherein the processor is further configured to receive a request to co-browse the web application with the website visitor from the operator over the communications interface.

11. The web-based server of claim 10, wherein the request is received after the operator observes the one or more UI events.

12. The web-based server of claim 10, wherein the processor is further configured to transmit the request to co-browse the web application to the website visitor over the communications interface.

13. The web-based server of claim 9, wherein the information comprises one or more of a name, email, company, phone, location, referral source, and engagement of the active visitors.

14. The web-based server of claim 9, wherein the one or more UI events comprise one or more events recognized by the web application interface.

15. The web-based server of claim 9, wherein the one or more UI events comprise one or more of a mouse click, mouse movement, a page refresh, and receipt of an event from the web application.

16. The web-based server of claim 9, wherein the information is provided by the website visitor.

* * * * *